(12) United States Patent
Lee et al.

(10) Patent No.: US 11,760,848 B2
(45) Date of Patent: Sep. 19, 2023

(54) LOW-DEFECT FABRICATION OF COMPOSITE MATERIALS

(71) Applicant: Massachusetts Institute of Technology, Cambridge, MA (US)

(72) Inventors: Jeonyoon Lee, Cambridge, MA (US); Brian L. Wardle, Lexington, MA (US); Diana Jean Lewis, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 17/375,190

(22) Filed: Jul. 14, 2021

(65) Prior Publication Data

US 2022/0177656 A1   Jun. 9, 2022

Related U.S. Application Data

(63) Continuation of application No. 16/056,745, filed on Aug. 7, 2018, now abandoned.

(60) Provisional application No. 62/559,189, filed on Sep. 15, 2017.

(51) Int. Cl.
| | |
|---|---|
| *C08J 5/00* | (2006.01) |
| *C01B 32/16* | (2017.01) |
| *C01B 32/15* | (2017.01) |
| *C08J 5/24* | (2006.01) |

(52) U.S. Cl.
CPC ............. *C08J 5/005* (2013.01); *C01B 32/15* (2017.08); *C01B 32/16* (2017.08); *C08J 5/249* (2021.05); *C01B 2202/08* (2013.01); *C08J 2363/00* (2013.01)

(58) Field of Classification Search
CPC ..... C01B 32/15; C01B 32/16; C01B 2202/08; C08J 5/005; C08J 5/24; C08J 5/249; B29C 66/345; B29C 66/8341; B29C 66/83411; B29C 66/836; B29C 66/8362; B29C 66/3452; B29C 65/564; B29C 66/30341
See application file for complete search history.

(56) References Cited

U.S. PATENT DOCUMENTS

| | | | |
|---|---|---|---|
| 3,580,731 | A | 5/1971 | Milewski et al. |
| 4,560,603 | A | 12/1985 | Giacomel |
| 4,562,033 | A | 12/1985 | Johnson et al. |
| 4,718,971 | A | 1/1988 | Summers |
| 4,770,926 | A | 9/1988 | Yamamura et al. |

(Continued)

FOREIGN PATENT DOCUMENTS

| | | |
|---|---|---|
| CN | 1701946 A | 11/2005 |
| CN | 102263221 A | 11/2011 |

(Continued)

OTHER PUBLICATIONS

U.S. Appl. No. 60/417,959, filed Oct. 11, 2002, Kim.

(Continued)

*Primary Examiner* — John L Goff, II
(74) *Attorney, Agent, or Firm* — Wolf, Greenfield & Sacks, P.C.

(57) ABSTRACT

Methods and systems for the fabrication of composite materials are generally described. Certain inventive methods and systems can be used to fabricate composite materials with few or no defects. According to certain embodiments, composite materials are fabricated without the use of an autoclave. In some embodiments, composite materials are fabricated in low pressure environments.

15 Claims, 16 Drawing Sheets

(56) References Cited

U.S. PATENT DOCUMENTS

| | | |
|---|---|---|
| 4,892,693 A | 1/1990 | Perrotta et al. |
| 5,149,584 A | 9/1992 | Baker et al. |
| 5,540,126 A | 7/1996 | Piramoon |
| 5,580,502 A | 12/1996 | Forster et al. |
| 5,648,109 A | 7/1997 | Gutowski et al. |
| 5,847,283 A | 12/1998 | Finot et al. |
| 5,916,469 A | 6/1999 | Scoles et al. |
| 5,954,917 A | 9/1999 | Jackson et al. |
| 6,155,514 A | 12/2000 | Hailey et al. |
| 6,265,333 B1 | 7/2001 | Dzenis et al. |
| 6,420,293 B1 | 7/2002 | Chang et al. |
| 6,495,258 B1 | 12/2002 | Chen et al. |
| 7,060,241 B2 | 6/2006 | Glatkowski |
| 7,132,161 B2 | 11/2006 | Knowles et al. |
| 7,160,531 B1 | 1/2007 | Jacques et al. |
| 7,323,157 B2 | 1/2008 | Kinloch et al. |
| 7,537,825 B2 | 5/2009 | Wardle et al. |
| 7,727,624 B2 | 6/2010 | Cao et al. |
| 7,884,525 B2 | 2/2011 | Culpepper et al. |
| 8,113,811 B2 | 2/2012 | Shim |
| 8,130,007 B2 | 3/2012 | Eldridge et al. |
| 8,337,979 B2 | 12/2012 | Wardle et al. |
| 8,388,795 B2 | 3/2013 | Tsotsis |
| 8,638,113 B2 | 1/2014 | Crafts et al. |
| 8,987,707 B2 | 3/2015 | Arnold et al. |
| 9,181,639 B2 | 11/2015 | Hart et al. |
| 9,394,175 B2 | 7/2016 | Hart et al. |
| 9,447,260 B2 | 9/2016 | Guber et al. |
| 9,478,610 B2 | 10/2016 | Hart et al. |
| 10,195,797 B2 | 2/2019 | Williams et al. |
| 10,265,683 B2 | 4/2019 | Hart et al. |
| 10,350,837 B2 | 7/2019 | Wardle et al. |
| 10,399,316 B2 | 9/2019 | Wardle et al. |
| 10,906,285 B2 | 2/2021 | Wardle et al. |
| 11,458,718 B2 | 10/2022 | Wardle et al. |
| 2003/0012721 A1 | 1/2003 | Nakayama et al. |
| 2003/0096104 A1 | 5/2003 | Tobita et al. |
| 2003/0143453 A1 | 7/2003 | Ren et al. |
| 2003/0203139 A1 | 10/2003 | Ren et al. |
| 2003/0231471 A1 | 12/2003 | De Lorenzo et al. |
| 2003/0236588 A1 | 12/2003 | Jang et al. |
| 2004/0071870 A1 | 4/2004 | Knowles et al. |
| 2004/0097635 A1 | 5/2004 | Fan et al. |
| 2004/0099438 A1 | 5/2004 | Arthur et al. |
| 2004/0105807 A1 | 6/2004 | Fan et al. |
| 2004/0235376 A1 | 11/2004 | Byma et al. |
| 2004/0250950 A1 | 12/2004 | Dubrow |
| 2005/0064185 A1 | 3/2005 | Buretea et al. |
| 2005/0066883 A1 | 3/2005 | Dubrow et al. |
| 2005/0081983 A1 | 4/2005 | Nakayama et al. |
| 2005/0116336 A1 | 6/2005 | Chopra et al. |
| 2005/0130341 A1 | 6/2005 | Furukawa et al. |
| 2005/0152826 A1 | 7/2005 | Shatwell |
| 2005/0167647 A1 | 8/2005 | Huang et al. |
| 2005/0170089 A1 | 8/2005 | Lashmore et al. |
| 2005/0176329 A1 | 8/2005 | Olry et al. |
| 2005/0215049 A1 | 9/2005 | Horibe et al. |
| 2005/0224220 A1 | 10/2005 | Li et al. |
| 2006/0000810 A1 | 1/2006 | Kerr |
| 2006/0018018 A1 | 1/2006 | Nomura et al. |
| 2006/0062944 A1 | 3/2006 | Gardner et al. |
| 2006/0073089 A1 | 4/2006 | Ajayan et al. |
| 2006/0166003 A1 | 7/2006 | Khabashesku et al. |
| 2006/0231970 A1 | 10/2006 | Huang et al. |
| 2006/0240238 A1 | 10/2006 | Boussaad et al. |
| 2006/0252853 A1 | 11/2006 | Ajayan et al. |
| 2006/0260751 A1 | 11/2006 | Lauder et al. |
| 2006/0270790 A1 | 11/2006 | Comeau |
| 2007/0004081 A1 | 1/2007 | Hsiao |
| 2007/0084551 A1 | 4/2007 | Watanabe et al. |
| 2007/0090489 A1 | 4/2007 | Hart et al. |
| 2007/0092431 A1 | 4/2007 | Resasco et al. |
| 2007/0128960 A1 | 6/2007 | Nejhad et al. |
| 2007/0190880 A1 | 8/2007 | Dubrow et al. |
| 2007/0244245 A1 | 10/2007 | Liu et al. |
| 2008/0018012 A1 | 1/2008 | Lemaire et al. |
| 2008/0075928 A1 | 3/2008 | Gunaratne et al. |
| 2008/0075954 A1 | 3/2008 | Wardle et al. |
| 2008/0086564 A1 | 4/2008 | Putman et al. |
| 2008/0170982 A1 | 7/2008 | Zhang et al. |
| 2008/0187648 A1 | 8/2008 | Hart et al. |
| 2008/0280137 A1 | 11/2008 | Ajayan et al. |
| 2008/0286564 A1 | 11/2008 | Tsotsis |
| 2009/0075157 A1 | 3/2009 | Pak et al. |
| 2009/0117363 A1 | 5/2009 | Wardle et al. |
| 2009/0266477 A1 | 10/2009 | Weisenberger et al. |
| 2009/0311166 A1 | 12/2009 | Hart et al. |
| 2010/0192851 A1 | 8/2010 | Shah et al. |
| 2010/0196695 A1 | 8/2010 | Garcia et al. |
| 2010/0203316 A1 | 8/2010 | Hata et al. |
| 2010/0255303 A1 | 10/2010 | Wardle et al. |
| 2010/0276072 A1 | 11/2010 | Shah et al. |
| 2010/0279569 A1 | 11/2010 | Shah et al. |
| 2011/0133135 A1 | 6/2011 | Maeno et al. |
| 2011/0159270 A9 | 6/2011 | Davis et al. |
| 2012/0015098 A1 | 1/2012 | Cheng et al. |
| 2012/0088056 A1 | 4/2012 | Hallander et al. |
| 2012/0164903 A1 | 6/2012 | Wardle et al. |
| 2012/0251432 A1 | 10/2012 | Cooper et al. |
| 2012/0282453 A1 | 11/2012 | Wang et al. |
| 2013/0029089 A1 | 1/2013 | Kia |
| 2013/0142987 A1 | 6/2013 | Wardle et al. |
| 2014/0127490 A1 | 5/2014 | Islam et al. |
| 2014/0154412 A1 | 6/2014 | Malecki et al. |
| 2014/0186547 A1 | 7/2014 | Wu et al. |
| 2014/0295166 A1 | 10/2014 | Steiner, III et al. |
| 2015/0000960 A1 | 1/2015 | Gaynor et al. |
| 2015/0037517 A1 | 2/2015 | Buriak et al. |
| 2015/0053927 A1 | 2/2015 | Arnold et al. |
| 2015/0360424 A1 | 12/2015 | Williams et al. |
| 2016/0059534 A1 | 3/2016 | Balachandra et al. |
| 2016/0083256 A1 | 3/2016 | Hart et al. |
| 2016/0340482 A1 | 11/2016 | Williams et al. |
| 2017/0057823 A1 | 3/2017 | Hart et al. |
| 2017/0110215 A1 | 4/2017 | Wright et al. |
| 2017/0341316 A1 | 11/2017 | Wardle et al. |
| 2018/0250852 A1 | 9/2018 | Kamihara et al. |
| 2019/0085138 A1 | 3/2019 | Lee et al. |
| 2019/0336948 A1 | 11/2019 | Hart et al. |
| 2020/0061985 A1 | 2/2020 | Wardle et al. |
| 2021/0300009 A1 | 9/2021 | Wardle et al. |

FOREIGN PATENT DOCUMENTS

| | | |
|---|---|---|
| EP | 1 489 630 A1 | 12/2004 |
| EP | 1 600 231 A1 | 11/2005 |
| EP | 1 637 828 A2 | 3/2006 |
| EP | 1 652 573 A1 | 5/2006 |
| EP | 2 330 077 A1 | 6/2011 |
| FR | 2865739 A1 | 8/2005 |
| JP | S50-119071 A | 9/1975 |
| JP | S63-93374 A | 4/1988 |
| JP | S63-97257 A | 4/1988 |
| JP | H2-17964 A | 1/1990 |
| JP | H2-147270 U | 12/1990 |
| JP | 2000-172202 A | 6/2000 |
| JP | 2001-080912 A | 3/2001 |
| JP | 2001-291465 A | 10/2001 |
| JP | 2002-141633 A | 5/2002 |
| JP | 2002-206169 A | 7/2002 |
| JP | 2002-293518 A | 10/2002 |
| JP | 2003-500325 A | 1/2003 |
| JP | 2003-119295 A | 4/2003 |
| JP | 2003-249166 A | 9/2003 |
| JP | 2003-286017 A | 10/2003 |
| JP | 2004-030926 A | 1/2004 |
| JP | 2004-055158 A | 2/2004 |
| JP | 2004-268192 A | 9/2004 |
| JP | 2005-007861 A | 1/2005 |
| JP | 2005-022141 A | 1/2005 |
| JP | 2005-068000 A | 3/2005 |
| JP | 2005-078880 A | 3/2005 |
| JP | 2005-170787 A | 6/2005 |
| JP | 2005-200676 A | 7/2005 |

(56) References Cited

FOREIGN PATENT DOCUMENTS

| JP | 2005-256222 | A | 9/2005 |
|---|---|---|---|
| JP | 2005-285821 | A | 10/2005 |
| JP | 2005-302305 | A | 10/2005 |
| JP | 2005-538026 | A | 12/2005 |
| JP | 2006-008473 | A | 1/2006 |
| JP | 2006-011296 | A | 1/2006 |
| JP | 2006-095429 | A | 4/2006 |
| JP | 2006-206169 | A | 8/2006 |
| JP | 2006-228818 | A | 8/2006 |
| JP | 2006-295120 | A | 10/2006 |
| JP | 2007-515364 | A | 6/2007 |
| JP | 2007-523033 | A | 8/2007 |
| JP | 2008-044099 | A | 2/2008 |
| JP | 2009-517531 | A | 4/2009 |
| JP | 2009-537339 | A | 10/2009 |
| JP | 2009-537439 | A | 10/2009 |
| JP | 2010-027251 | A | 2/2010 |
| JP | 2010-257975 | A | 11/2010 |
| JP | 4883841 | B2 | 2/2012 |
| JP | 2012-087016 | A | 5/2012 |
| JP | 2012-510426 | A | 5/2012 |
| WO | WO 01/94260 | A1 | 12/2001 |
| WO | WO 03/49219 | A1 | 6/2003 |
| WO | WO 03/69019 | A1 | 8/2003 |
| WO | WO 03/93174 | A1 | 11/2003 |
| WO | WO 2004/094303 | A2 | 11/2004 |
| WO | WO 2005/028549 | A2 | 3/2005 |
| WO | WO 2005/044723 | A2 | 5/2005 |
| WO | WO 2005/075341 | A2 | 8/2005 |
| WO | WO 2006/120803 | A1 | 11/2006 |
| WO | WO 2006/135375 | A2 | 12/2006 |
| WO | WO 2007/055744 | A2 | 5/2007 |
| WO | WO 2007/116706 | A1 | 10/2007 |
| WO | WO 2007/136755 | A2 | 11/2007 |
| WO | WO 2008/054409 | A2 | 5/2008 |
| WO | WO 2008/054541 | A2 | 5/2008 |
| WO | WO 2008/103221 | A1 | 8/2008 |
| WO | WO 2009/029218 | A2 | 3/2009 |
| WO | WO 2010/120564 | A3 | 10/2010 |
| WO | WO 2011/106109 | A2 | 9/2011 |
| WO | WO 2012/074367 | A1 | 6/2012 |
| WO | WO 2014/197078 | A2 | 12/2014 |
| WO | WO 2015/120011 | A1 | 8/2015 |
| WO | WO 2015/199785 | A2 | 12/2015 |
| WO | WO 2016/030746 | A1 | 3/2016 |
| WO | WO 2016/194676 | A1 | 12/2016 |

OTHER PUBLICATIONS

U.S. Appl. No. 60/740,461, filed Nov. 28, 2005, Nejhad.
International Search Report and Written Opinion dated Oct. 24, 2018 for Application No. PCT/US2018/045502.
International Preliminary Report on Patentability dated Mar. 26, 2020 in PCT/US2018/045502.
Extended European Search Report for dated Apr. 6, 2021 for EP App. No. 18855286.3.
[No Author Listed] Buckypaper systems for treatment of acute wounds. NanoTech Briefs. 2005, 2 pages.
Ahn et al., Simultaneous measurements of permeability and capillary pressure of thermosetting matrices in woven fabric reinforcements. Polym. Compos. Jun. 1991;12(3):146-52.
Ajayan et al., Materials science—Nanotube composites. Nature. Jun. 28, 2007;447(7148):1066-8.
Amico et al., An experimental study of the permeability and capillary pressure in resin-transfer moulding. Compos. Sci. Technol. 2001;61(13):1945-59.
Andrews et al., Continuous production of aligned carbon nanotubes: a step closer to commercial realization. Chem Phys Lett. Apr. 16, 1999;303(5-6):467-74.
Aravand et al., Internal geometry of woven composite laminates with "fuzzy" carbon nanotube grafted fibers. Composites: Part A. 2016;88:295-304. Epub Jun. 16, 2016.

Barber et al., Measurement of carbon nanotube-polymer interfacial strength. Applied Physics Letters. Jun. 9, 2003;82(23): 4140-2.
Bauhofer et al., A review and analysis of electrical percolation in carbon nanotube polymer composites. Compos Sci Technol. 2009;69:1486-98. doi:10.1016/j.compscitech.2008.06.018, 13 pages. Epub Jun. 25, 2008.
Bennett et al., Controlling the morphology of carbon nanotube films by varying the areal density of catalyst nanoclusters using block copolymer micellar thin films. Advanced Materials. Sep. 2006; 18(17): 2274-9.
Bennett et al., Creating patterned carbon nanotube catalysts through the microcontact printing of block copolymer micellar thin films. Langmuir. Sep. 26, 2006;22(20):8273-6.
Bennett et al., Using block copolymer micellar thin films as templates for the production of catalysts for carbon nanotube growth. Chemistry of Materials. Nov. 25, 2004; 16(26): 5589-98. DOI: 10.1021/cm0489921.
Bhattacharya, Polymer nanocomposites—A comparison between carbon nanotubes, graphene, and clay as nanofillers. Materials. 2016;9:262(1-35). Epub Apr. 1, 2016.
Blanco et al., Limiting mechanisms of Mode 1 interlaminar toughening of composites reinforced with aligned carbon nanotubes. J. Composite Mater. Apr. 2009; 43(8):825-41. doi: 10.1177/0021998309102398.
Boncel et al., Dynamics of capillary infiltration of liquids into a highly aligned multi-walled carbon nanotube film. Beilstein J. Nanotechnol. 2011;2:311-7. Epub Jun. 20, 2011.
Boskovic et al., Low temperature synthesis of carbon nanofibres on carbon fibre matrices. carbon. Nov. 2005;43(13): 2643-8. doi:10.1016/j.carbon.2005.04.034.
Bradshaw et al., Fiber waviness in nanotube-reinforced polymer composites—II: modeling via numerical approximation of the dilute strain concentration tensor. Comp Sci Technol. 2003;63:1705-22.
Breuer et al., Big returns from small fibers: a review of polymer/carbon nano tube composites. Polymer Composites. Dec. 2004; 25(6), 630-45. DOI: 10.1002/pc.20058.
Brunauer et al., Adsorption of gases in multimolecular layers. J Am Chem Soc. Feb. 1938; 60(2): 309-319.
Campbell, Polymer Matrix Composites. Ch. 7 in Manuf. Tech for Aerospace Structural Materials. 2006. Elsevier. pp. 273-368.
Cao et al., Multifunctional brushes made from carbon nanotubes. Nat Mater. Jul. 2005;4(7):540-5. Epub Jun. 12, 2005.
Cebeci et al., Multifunctional properties of high volume fraction aligned carbon nanotube polymer composites with controlled morphology. Compos. Sci. Technol. 2009;69:2649-56. Epub Aug. 19, 2009.
Cebeci et al., Processing of hybrid advanced composities utilizing capillarity-driven wetting of aligned carbon nanotubes. In 2008 SAMPE Fall Tech Conf and Exhibition—Multifunctional Materials: Working Smarter Together (SAMPE '08). Memphis, TN. Sep. 2008. 16 pages.
Chee et al., Nanocomposites of graphene/polymers: A review. RSC Adv. 2015;5:68014-51.
Cheng, Measurement of surface tension of epoxy resins used in dispensing process for manufacturing thin film transistor-liquid crystal displays. IEEE Transactions on Advanced Packaging. Feb. 2008; 31(1):100-6.
Chu, MIT News, Taking aircraft manufacturing out of the oven. Apr. 14, 2015; 3 pages. http://news.mit.edu/2015/carbon-nanotube-film-heats-composite-materials-0414.
Ci et al., Direct growth of carbon nanotubes on the surface of ceramic fibers. Carbon. Jan. 2005;43(4): 883-6. doi:10.1016/j.carbon.2004.11.010.
Coleman et al., High-performance nanotube-reinforced plastics: understanding the mechanism of strength increase. Advanced Functional Materials. Aug. 2004; 14(8): 791-8. doi: 10.1002/adfm.200305200.
Coleman et al., Improving the mechanical properties of single-walled carbon nanotube sheets by intercalation of polymeric adhesives. Applied Physics Letters. Mar. 17, 2003; 82(11): 1682-4.
Coleman et al., Small but strong: A review of the mechanical properties of carbon nanotube-polymer composites. Carbon. Aug. 2006; 44(9): 1624-1652. doi:10.1016/j.carbon.2006.02.038.

(56) References Cited

OTHER PUBLICATIONS

Cooper et al., Detachment of nanotubes from a polymer matrix. Applied Physics Letters. Nov. 11, 2002; 81(20): 3873-5.
Du et al., Effect of nanotube alignment on percolation conductivity in carbon nanotube/polymer composites. Physical Review B. Sep. 2005; 72(12): 121404-1. DOI: 10.1103/PhysRevB.72.121404.
Endo et al., Atomic nanotube welders: boron interstitials triggering connections in double-walled carbon nanotubes. Nano Lett. Jun. 2005;5(6):1099-105.
Ergun et al., Fluid flow through randomly packed cols. and fluidized beds. Industrial & Engineering Chemistry. 1949;41(6):1179-84.
Fan et al., Carbon nanotube arrays on silicon substrates and their possible application. Physica E. Aug. 2000;8(2):179-83.
Fan et al., Experimental investigation of dispersion during flow of multi-walled carbon nanotube/polymer suspension in fibrous porous media. Carbon. 2004;42(4):871-6.
Fan et al., Self-oriented regular arrays of carbon nanotubes and their field emission properties. Science. Jan. 22, 2009; 283(5401): 512-514.
Gao et al., In situ sensing of impact damage in epoxy/glass fiber composites using percolating carbon nanotube networks. Carbon. 2011;49(10):3382-5. Epub Apr. 9, 2011.
Garcia et al, Joining prepreg composite interfaces with aligned carbon nanotubes. Composites: Part A. 2008;39(6):1065-70.
Garcia et al., (Student Paper) Fabrication and testing of long carbon nanotubes grown on the surface of fibers for hybrid composites. Presented at the 47th AIAA/ASME/ASCE/AJS/ASC Structures, Structural Dynamics, and Materials Conference, Newport, R.I., May 14, 2006, 11 pages.
Garcia et al., Fabrication and nanocompression testing of aligned carbon-nanotube-polymer nanocomposites. Adv Mater. Jul. 12, 2007;19:2151-6.
Garcia et al., Fabrication of composite microstructures by capillarity-driven wetting of aligned carbon nanotubes with polymers. Nanotechnol. 2007; 18:165602(1-11). Epub Mar. 23, 2007.
Gibson, A review of recent research on mechanics of multifunctional composite materials and structures. Composite Structures 2010;92(12):2793-2810. Epub May 8, 2010.
Guzman de Villoria et al., Multi-physics damage sensing in nano-engineered structural composites. Nanotechnol. 2011;22(18):185502(1-7). Epub Mar. 22, 2011.
Harris. Carbon nanotube composites. International Materials Reviews. 2004;49(1):31-43.
Hart et al., Desktop growth of carbon-nanotube monoliths with in situ optical imaging. Small. May 2007;3(5):772-7.
Hart et al., Force output, control of film structure, and microscale shape transfer by carbon nanotube growth under mechanical pressure. Nano Lett. Jun. 2006;6(6):1254-60.
Hart et al., Growth of conformal single-walled carbon nanotube films from Mo/Fe/Al2O3 deposited by electron beam evaporation. Carbon. Feb. 2006; 44(2): 348-59.
Hart et al., Rapid growth and flow-mediated nucleation of millimeter-scale aligned carbon nanotube structures from a thin-film catalyst. J Phys Chem B. Apr. 27, 2006;110(16):8250-7.
Hart et al., Versatility of the Fe/Al$_2$O$_3$ system for high-yield carbon nanotube growth by thermal CVD of C$_2$H$_4$. NT05: Sixth International Conference on the Science and Application of Nanotubes; Göteborg University, Chalmers University of Technology, and University College of Borås; (Gothenburg, Sweden); Jun. 26-Jul. 1, 2005. Abstract, 1 page.
Hart et al., Versatility of the Fe/Al2O3 system for high-yield carbon nanotube growth by thermal CVD of C2H4. NT05: Sixth International Conference on the Science and Application of Nanotubes; Göteborg University, Chalmers University of Technology, and University College of Borås; (Gothenburg, Sweden); Jun. 26-Jul. 1, 2005. Poster, 1 page.
Hart, A.J., "Chemical, mechanical, and thermal control of substrate-bound carbon nanotube growth." Doctoral Thesis, Department of Mechanical Engineering, Dec. 31, 2007, 2006, 357 pages.
Hong et al., Synthesis of carbon nanotubes using microwave radiation. Adv Funct Mater. Dec. 2003;13(12):961-6.
Hsieh et al., The effect of carbon nanotubes on the fracture toughness and fatigue performance of a thermosetting epoxy polymer. J Mater Sci. 2011;46:7525-35.
Hubert et al., Autoclave processing for composites. Ch. 13 in Manufacturing Techniques for Polymer Matrix Composites (PMCs). Ed. by Advani et al., pp. 414-434. Woodhead Publishing Ltd.: Cambridge, England. 2012.
Huh et al., Control of carbon nanotube growth using cobalt nanoparticles as catalyst. Applied Surface Science.Elsevier. Aug. 2005; 249(1-4): 145-50. DOI: 10.1016/j.apsusc.2004.11.059.
Ishiguro et al., Processing and characterization of infusion-processed hybrid composites with in situ grown aligned carbon nanotubes. 50th AIAA/ASME/ASCE/AHS/ASC Structures, Structural Dynamics, and Materials Conference. May 4-7, 2009. Palm Springs, CA. AIAA 2009-2541. 9 pages.
Kaiser et al., Process-morphology scaling relations quantify self-organization in capillary densified nanofiber arrays. Phys Chem Chem Phys. Jan. 2, 2018;20:3876-881.
Kis et al., Reinforcement of single-walled carbon nanotube bundles by intertube bridging. Nat Mater. Mar. 2004;3(3):15 3-7. Epub Feb. 15, 2004.
Koratkar et al., Multifunctional structural reinforcement featuring carbon nanotube films. Composites Science and Technology. Jul. 2003; 63: 1525-31. doi:10.1016/S0266-3538(03)00065-4.
Krasheninnikov et al., Ion-irradiation-induced welding of carbon nanotubes. Physical Review B. Dec. 2002; 66(24):245403-1-6. doi: 10.1103/PhysRevB.66.245403.
Krasheninnikov et al., Irradiation effects in carbon nanotubes. Nuclear Instruments and Methods in Physics Research B. Feb. 2004;216:355-66.
Kuentzer et al., Permeability characterization of dual scale fibrous porous media. Composites: Part A. 2006;37(11):2057-68.
Kundalwal et al., Effective thermal conductivities of a novel fuzzy fiber-reinforced composite containing wavy carbon nanotubes. Journal of Heat Transfer. Jan. 2015;137:012401-1-012401-12.
Kwok et al., Continuous deposition of carbon nanotubes on a moving substrate by open-air laser-induced chemical vapor deposition. Carbon. Oct. 2005; 43(12): 2571-8.
Lee et al., Aligned carbon nanotube film enables thermally induced state transformations in layered polymeric materials. ACS Appl Mater Interf. 2015;7:8900-05.
Lee et al., Carbon fiber prepreg composite laminates cured via conductive curing using nanoengineered nanocomposite heaters. 21st Intl Conf on Composite Materials. Xi'an, China. Aug. 2017. 8 pages.
Lewis, Interlaminar reinforcement of carbon fiber composites from unidirectional prepreg utilizing aligned carbon nanotubes. MIT Thesis for Master of Science in Aeronautics and Astronautics. Feb. 2016. Made available on Jan. 19, 2017. 119 pages.
Li et al., Hierarchical carbon nanotube carbon fiber unidirectional composites with preserved tensile and interfacial properties. Compos Sci Technol. 2015;117: 139-145. Epub Apr. 30, 2015.
Lomov et al., Compressibility of nanofibre-grafted alumina fabric and yarns: Aligned carbon nanotube forests. Compos Sci Technol. 2014;90:57-66. Epub Nov. 4, 2013.
Louis et al., Out-of-Autoclave Prepreg Processing. In Wiley Encyclopedia of Composites, Second Ed., vol. 5. Jul. 2012. Wiley & Sons, https://doi.org/10.1002/9781118097298.weoc056. 5 pages.
Mazumdar, Composites Manufacturing: Materials, Product, and Process Engineering. Section 6.8.1.5 Methods of Applying Heat and Pressure. CRC Press. 2002. 5 pages.
Mehdikhani et al., Strain mapping at the micro-scale in hierarchical polymer composites with aligned carbon nanotube grafted fibers. Compos Sci Technol. 2016;137:24-34. Epub Oct. 24, 2016.
Merchan-Merchan et al., High flame synthesis of vertically aligned carbon nanotubes using electric field control. Carbon. 2004:42:599-608.
Motamedi et al., Effect of straight and wavy carbon nanotube on the reinforcement modulus in nonlinear elastic matrix nanocomposites. Mater and Design. Feb. 2012;34:603-8.

(56) References Cited

OTHER PUBLICATIONS

Natarajan et al., The evolution of carbon nanotube network structure in unidirectional nanocomposites resolved by quantitative electron tomography, with Supplemental Information. ACS Nano. 2015;9(6):6050-8. doi: 10.1021/acsnano.5b01044, Epub Jun. 1, 2015, 20 pages.

Olivier et al., Effects of cure cycle pressure and voids on some mechanical properties of carbon/epoxy laminates. Composites. 1995;26(7):509-15.

Parnas et al., The interaction between micro- and macroscopic flow in RTM preforms. Composite Structures. 1994;27(1-2):93-107.

Qian et al., Carbon nanotube-based hierarchical composites: A review. J Mater Chem. 2010;20(23):4751-62.

Ray et al., Load transfer analysis in short carbon fibers with radially-aligned carbon nanotubes embedded in a polymer matrix. J. Adv. Mater. Oct. 2009;41(4):82-94.

Romanov et al., Can carbon nanotubes grown on fibers change stress distribution in a composite? Composites: Part A. 2014;63:32-4. Epub Apr. 5, 2014.

Sandler et al., Ultra-low electrical percolation threshold in carbon-nanotube-epoxy composites. Polymer. Sep. 2003; 44(19): 5893-9.

Schlimbach et al., Out-of-autoclave curing process in polymer matrix composites. Ch. 14 in Manufacturing Techniques for Polymer Matrix Composites (PMCs). Ed. by Advani et al., pp. 435-480. Woodhead Publishing Ltd.: Cambridge, England. 2012.

Skartsis et al., Resin flow through fiber beds during composite manufacturing processes. Part I: Review of newtonian flow through fiber beds. Polym Eng Sci. Feb. 1992;32(4):221-30.

Spitalsky et al., Carbon nanotube-polymer composites: Chemistry, processing, mechanical and electrical properties. Progress in Polymer Science 2010;35(3):357-401. Epub Sep. 25, 2009.

Stein et al., Aligned carbon nanotube array stiffness from stochastic three-dimensional morphology. Nanoscale. 2015;7:19426-31.

Swolfs et al., Stress concentrations in hybrid unidirectional fibre-reinforced composites with random fibre packings. Compos Sci Technol. 2013;85:10-16. Epub Jun. 1, 2013.

Terrones et al., Controlled production of aligned-nanotube bundles. Nature. Jul. 3, 1997; 388(6637): 52-5.

Thostenson et al., Advances in the science and technology of carbon nanotubes and their composites: A Review. Composites Science and Technology. Oct. 2001; 61(13):1899-1912.

Thostenson et al., Carbon nanotube/carbon fiber hybrid multiscale composites. Journal of Applied Physics. Apr. 2002;91(9): 6034-7.

Thostenson et al., Nanocomposites in context. Composites Science and Technology. Mar. 2005; 65(3-4):491-516. doi:10.1016/j.compscitech.2004.11.003.

Vaisman et al., The role of surfactants in dispersion of carbon nanotubes. Adv Colloid Interface Sci. 2006;128-130:37-46. Epub Jan. 10, 2007.

Van Noorden, The trials of the new carbon. Nature. 2011; 469:14-16.

Veedu et al., Multifunctional composites using reinforced laminae with carbon-nanotube forests. Nature Materials. Jun. 2006; 5:457-62.

Wagner et al., Nanotube-polymer adhesion: a mechanics approach. Chemical Physics Letters. Jul. 24, 2002; 361(1-2):57-61.

Wardle et al., Fabrication and characterization of ultrahigh-volume-fraction aligned carbon nanotube-polymer composites. Adv Mater. 2008;20:2707-14.

Washburn, The dynamics of capillary flow. Phys. Rev. 1921;17(3):273-83.

Wicks et al., Interlaminar and intralaminar reinforcement of composite laminates with aligned carbon nanotubes. Compos. Sci. Technol. 2010;70(1):20-28.

Wicks et al., Multi-scale interlaminar fracture mechanisms in woven composite laminates reinforced with aligned carbon nanotubes. Compo. Sci. Technol. 2014;100:128-35.

Wu et al., Carbon nanotube film interlayer for strain and damage sensing in composites during dynamic compressive loading. Appl Phys Lett 2012;101(22):221909. 5 pages.

Xu et al., In-situ curing of glass fiber reinforced polymer composites via resistive heating of carbon nanotube films. Composites Sci and Technol. 2017;149:20-7.

Yaglioglu et al., Wide range control of microstructure and mechanical properties of carbon nanotube forests: A comparison between fixed and floating catalyst CVD techniques. Adv Funct Mater. 2012. doi:10/1002/adfm.201200852, 10 pages.

Yamamoto et al, High-yield growth and morphology control of aligned carbon nanotubes on ceramic fibers for multifunctional enhancement of structural composites. Carbon 2009;47(3):551-60.

Zhao et al, A Bone mimic based on the self-assembly of hydroxyapatite on chemically functionalized single-walled carbon nanotubes. Chem. Mater. May 13, 2005; 17(12): 3235-41. doi: 10.1021/cm0500399.

Zhou et al., A closed form solution for flow in dual scale fibrous porous media under constant injection pressure conditions. Compos Sci Technol. 2008;68(3-4):699-708. Epub Sep. 26, 2007.

Zhu et al., Direct synthesis of long single-walled carbon nanotube strands. Science. May 3, 2002; 296(5569): 884-6. XP-002273566. DOI:10.1126/Science.1066996.

Suhr, et al. Fatigue resistance of aligned carbon nanotube arrays under cyclic compression. Nat Nanotechnol. Jul. 2007;2(7):417-21. doi: 10.1038/nnano.2007.186. Epub Jul. 1, 2007.

European Office Action dated Sep. 28, 2022, for EP Application No. 18855286.3, with pending claims attached.

US 11,760,848 B2

LOW-DEFECT FABRICATION OF COMPOSITE MATERIALS

RELATED APPLICATIONS

This application is a continuation of U.S. patent application Ser. No. 16/056,745, filed Aug. 7, 2018, now abandoned, and entitled "Low-Defect Fabrication of Composite Materials," which claims priority under 35 U.S.C. § 119(e) to U.S. Provisional Application No. 62/559,189, filed Sep. 15, 2017, and entitled "Low-Defect Fabrication of Composite Materials," each of which is incorporated herein by reference in its entirety for all purposes.

TECHNICAL FIELD

The fabrication of composite materials is generally described.

SUMMARY

Methods and systems for the fabrication of composite materials are generally described. Certain inventive methods and systems can be used to fabricate composite materials with few or no defects. According to certain embodiments, composite materials are fabricated without the use of an autoclave. In some embodiments, composite materials are fabricated in low pressure environments. The subject matter of the present invention involves, in some cases, interrelated products, alternative solutions to a particular problem, and/or a plurality of different uses of one or more systems and/or articles.

Certain embodiments relate to methods of forming composite articles.

In one embodiment, a method comprises arranging, within an environment, a collection of nanostructures between a first substrate comprising a polymer and a second substrate comprising a polymer; and heating the first substrate and/or the second substrate such that polymer within the first substrate and/or polymer within the second substrate softens and/or melts and nanostructures within the collection become at least partially embedded in the first substrate and/or the second substrate to form the composite article. In some embodiments, the collection of nanostructures is separate from the first substrate and the second substrate during at least a portion of the arranging step. In some embodiments, a pressure of the environment does not exceed 3 bar absolute during any part of the heating step.

According to certain embodiments, the method comprises heating a first substrate and/or a second substrate out of an autoclave such that at least a portion of the first substrate and/or at least a portion of the second substrate softens and/or melts and a collection of nanostructures between the first substrate and the second substrate becomes at least partially embedded within the first substrate and/or the second substrate to form the composite article.

Some embodiments comprise heating a first substrate and/or a second substrate while the first substrate and/or the second substrate is in an environment having a pressure of less than 3 bar absolute, such that at least a portion of the first substrate and/or at least a portion of the second substrate softens and/or melts and a collection of nanostructures between the first substrate and the second substrate becomes at least partially embedded within the first substrate and/or the second substrate to form the composite article.

Certain embodiments comprise arranging, within an environment, a collection of nanostructures between a first substrate comprising a polymer and a second substrate comprising a polymer; and heating the first substrate and/or the second substrate such that polymer within the first substrate and/or polymer within the second substrate softens and/or melts and nanostructures within the collection become at least partially embedded in the first substrate and/or the second substrate to form the composite article; wherein during at least a portion of the arranging step, the collection of nanostructures is separate from the first substrate and the second substrate.

Some embodiments comprise arranging, within an environment, a collection of nanostructures between a first substrate comprising a polymer and a second substrate comprising a polymer; and heating the first substrate and/or the second substrate such that polymer within the first substrate and/or polymer within the second substrate softens and/or melts and nanostructures within the collection become at least partially embedded in the first substrate and/or the second substrate to form the composite article; wherein heating the first substrate and/or the second substrate comprises moving a source of the heat laterally across the first substrate and/or the second substrate.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
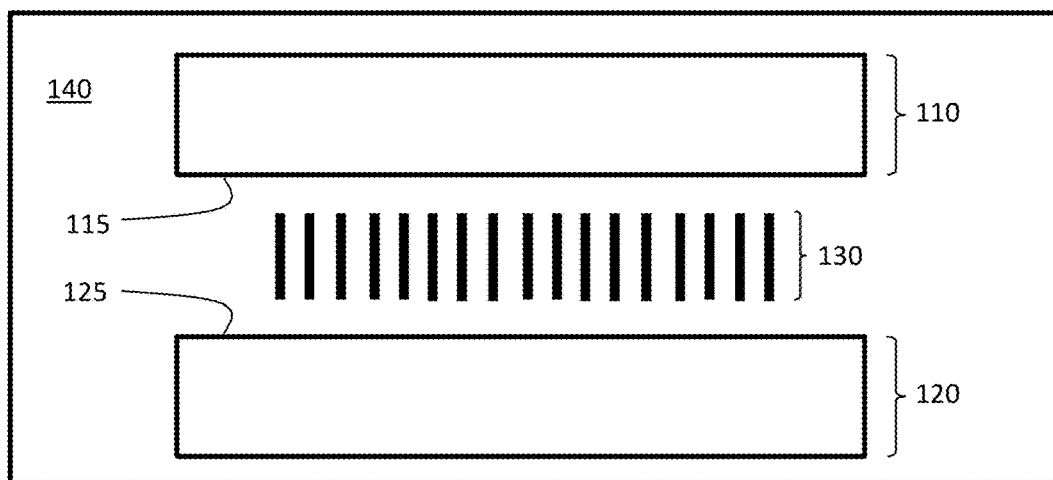
FIGS. 1A-1C depict a non-limiting embodiment of a method forming a composite article in accordance with certain embodiments.

Methods for forming composite articles comprising at least a first substrate and a second substrate, each comprising a polymer, are generally provided. In some embodiments, a method may comprise a step in which one or more of the substrates is heated in an environment such that a collection of nanostructures arranged between the substrates may become at least partially embedded in the first substrate and/or the second substrate. Embedding the nanostructures in the substrate(s) may cause the substrates to join together to form a material with relatively fewer voids than would form if the substrates were heated under an otherwise equivalent environment in which nanostructures did not become embedded in the substrate(s). Performing the methods described herein may thus result in the formation of a composite article with fewer voids, and/or in the formation of a composite article containing an acceptably small number of voids under milder and/or less expensive conditions than would otherwise be required.

Without wishing to be bound by any particular theory, it is believed that arranging a suitable collection of nanostructures between the first substrate and the second substrate may cause the nanostructures to become at least partially embedded in the first substrate and/or the second substrate when the first substrate and/or the second substrate is heated. The suitable collection of nanostructures may have a size and/or arrangement, as described in further detail below, that promotes capillary flow of the polymer in the first and/or second substrate between the nanostructures, thus embedding the nanostructures in the first substrate and/or second substrate. The capillary forces may cause the polymer to flow through the collection of nanostructures and/or across the interface between the substrates along channels between the nanostructures (e.g., portions of the volume within the collection of nanostructures unfilled by nanostructures, such as pores). The channels may also provide a direction along which any gas or other trapped material can escape. In some embodiments, the flow may be in a relatively uniform direction, which may promote relatively even filling of the channels. In certain cases, the embedded nanostructures may have a morphology that exerts sufficiently strong capillary forces on the polymer so that the channels may be completely (or almost completely) filled when capillary forces make up a relatively large percentage of the total force the polymer is subject to. For example, in some cases the substrates may be joined together with relatively few voids when present in an environment of less than 3 bar absolute (i.e., having an absolute pressure of less than 3 bar).

In some embodiments, the methods described herein may be suitable for curing prepregs that are typically cured under elevated pressure, under pressures that are relatively reduced. For example, the methods described herein may be suitable for curing autoclave prepregs in non-autoclave environments. As would be understood by one of ordinary skill in the art, prepregs are materials that include one or more layers of polymer material (e.g., thermoset or thermoplastic resin) containing embedded fibers. As would also be understood by one of ordinary skill in the art, autoclave prepregs are prepregs that are designed to include at least one curing step in which the prepreg is subjected to elevated temperature and pressure in an autoclave. Without wishing to be bound by any particular theory, the high temperature in the autoclave is believed to soften and cure the thermoset or thermoplastic resin therein. The high pressure in the autoclave is believed to apply a force that causes the thermoplastic or thermoset resin therein to flow together to join the prepregs along an interface that includes relatively few voids. If autoclave prepregs are cured outside of an autoclave using prior methods (e.g., without nanostructures at the interface), they are typically joined along an interface that includes an undesirably high number of voids. Certain of the methods described herein may thus reduce the cost and/or complexity associated with curing autoclave prepregs while maintaining desirable characteristics of the final, cured composite (e.g., low or no voids, high interlaminar shear strength, etc.).

Figure 1B:
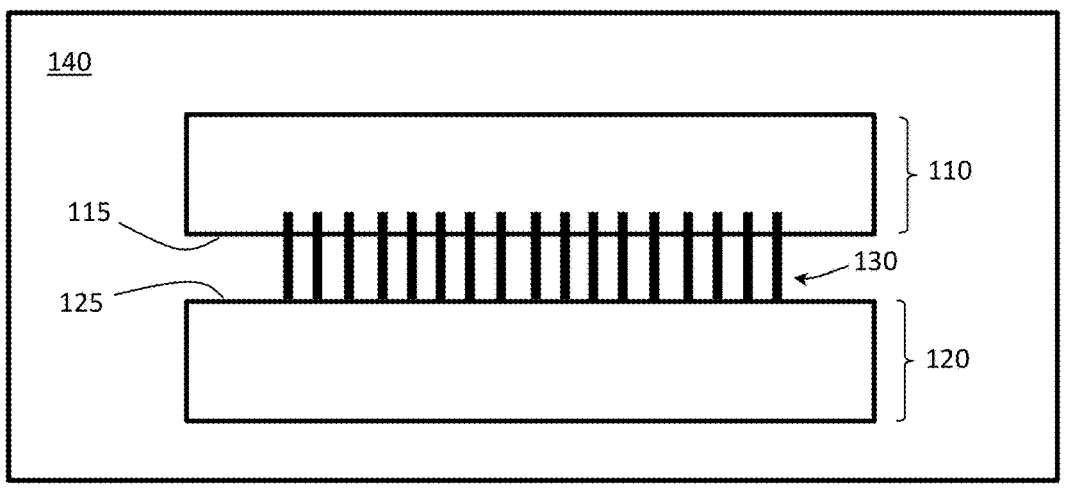

As described above, certain embodiments relate to a method comprising a step of arranging, within an environment, a collection of nanostructures between a first substrate and a second substrate. In some embodiments, the collection of nanostructures is separate from the first substrate and the second substrate during at least a portion (or all) of the arranging step. FIGS. 1A and 1B show two non-limiting embodiments of methods for arranging a collection of nanostructures between a first substrate and a second substrate in an environment. In FIGS. 1A and 1B, collection of nanostructures 130 is arranged between first substrate 110 comprising first surface 115 and second substrate 120 comprising second surface 125. During the arranging step, the collection of nanostructures, first substrate, and second substrate are situated within environment 140.

In some embodiments, such as is shown in FIGS. 1A and 1B, the collection of nanostructures may be spatially separated from the first substrate and/or the second substrate (i.e., not in direct topological contact with the first substrate and/or the second substrate) prior to being arranged between the first substrate and the second substrate. In other embodiments, the collection of nanostructures may be separate from one or both of the substrate(s) while not being spatially separated from those substrates. As an example, the collection of nanostructures may be separable from the first substrate and/or the second substrate without the use of appreciable force or specialized tools prior to being arranged between the first substrate and the second substrate. For instance, the collection of nanostructures may be separable from the first substrate and the second substrate by simple manipulation (e.g., by lifting the collection of nanostructures from the first substrate and the second substrate by use of tweezers) prior to being arranged between the first substrate and the second substrate. As a second example, the collection of nanostructures may be cleanly separable from the first substrate and the second substrate (i.e., capable of being separated such that the separated collection of nanostructures contains minimal or zero amounts of the first substrate and second substrate and the first substrate and second substrate contain minimal or zero amounts of the collection of nanostructures) under the application of minimal force prior to being arranged between the first substrate and the second substrate.

According to certain embodiments, the collection of nanostructures can originate from a growth substrate that is different from the first substrate (e.g., substrate 110 in FIG. 1A) and different from the second substrate (e.g., substrate 120 in FIG. 1A). For example in some embodiments, the collection of nanostructures can be grown on a growth substrate, removed from the growth substrate, and arranged between the first substrate (e.g., substrate 110) and the second substrate (e.g., substrate 120). Exemplary methods for growing and removing collections of nanostructures are described, for example, in International Patent Publication No. WO 2009/029218, filed Aug. 22, 2008 as Application Number PCT/US2008/009996, and entitled "Nanostructure-Reinforced Composite Articles and Methods," which is incorporated herein by reference in its entirety for all purposes.

In some embodiments, arranging the collection of nanostructures between a first substrate and a second substrate may bring the collection of nanostructures into topological contact with the first substrate and/or bring the collection of nanostructures into topological contact with the second substrate if the collection of nanostructures is not already in topological contact with the first substrate and/or second substrate prior to the arranging step. In other words, in certain cases the collection of nanostructures may be adjacent (e.g., directly adjacent) with one or both of the first substrate and the second substrate after the arranging step. The collection of nanostructures may be brought into topological contact with (e.g., made adjacent to) the first substrate and/or the second substrate by any suitable manner, such as by spraying the collection of nanostructures onto the first substrate and/or the second substrate (e.g., by use of an air brush).

As used herein, two components (e.g., a collection of nanostructures, a substrate) are directly adjacent when they are adjacent and there is no intervening component positioned between them. Two components that are adjacent may be directly adjacent, or may have one or more intervening components positioned between them (e.g., the first substrate may be adjacent to the second substrate when the collection of nanostructures is positioned between the first substrate and the second substrate). It should also be understood that when a component is referred to as being "adjacent" or "between" another component(s), it may be adjacent or between the entire component(s) or adjacent or between a part of the component(s). For example, the collection of nano structures may be arranged between the entirety of the first substrate and the entirety second substrate, may be arranged between a portion of the first substrate and the entirety of the second substrate, or may be arranged between a portion of the first substrate and a portion of the second substrate.

In some embodiments, a method may comprise heating the first substrate and/or the second substrate. For example, the first substrate and/or the second substrate may be heated after a step in which a collection of nanostructures is arranged therebetween. The substrate(s) may be heated by using any suitable technique (e.g., by direct contact with a heating element such as a resistive heating element; by contact with a heated fluid such as air inside an oven, a liquid in contact with a source of heat, and/or heated $N_2$ inside an autoclave (e.g., an autoclave under atmospheric pressure)). Other heat sources include, but are not limited to, heating blankets and/or electromagnetic radiation (e.g., microwave radiation). In some embodiments, the substrate(s) may be heated while the composite article and/or the precursors thereof are in an environment with a pressure of less than 3 bar absolute. In some embodiments, the substrate(s) are heated in an environment while the pressure of the environment does not exceed, during any portion of the heating step, 3 bar absolute. The pressure of the environment may also be less than 3 bar absolute during one or more steps performed prior to and/or after the heating step (e.g., during the arranging step, during any post processing steps) in certain cases.

In certain embodiments, the method comprises locally heating the first substrate and/or the second substrate. For example, in some embodiments, the first substrate and the second substrate are not located within an autoclave or any other type of oven during the heating process. In some embodiments, vacuum bag curing is employed (e.g., in which the first substrate and the second substrate are located within a vacuum bag during the heating process). In some embodiments, less than 30% (or less than 20%, less than 10%, less than 5%, or less) of the energy used to heat the first substrate and the second substrate is transferred to the substrates via convective heat transfer.

In some embodiments, polymer within the first substrate and/or polymer within the second substrate may soften and/or melt during at least a portion of the heating (e.g., the portion of the heating during which the pressure of the environment is less than 3 bar absolute). The softening and/or melting of the polymer may cause the polymer to become more compliant and/or less viscous. In certain embodiments, the softening and/or melting of the polymer may reduce the absolute viscosity of the polymer (e.g., from greater than or equal to 1000 Poise, 2000 Poise, 3000 Poise, or greater) to less than or equal to 100 Poise, less than or equal to 50 Poise, less than or equal to 20 Poise, or less than or equal to 10 Poise. In some cases, the softening and/or melting of the polymer may cause the polymer to flow within substrate(s) and/or through the collection of nanostructures arranged therebetween (e.g., into one or more channels present in the collection of nanostructures). One or both of these effects may cause one or more nanostructures within the collection of nanostructures to penetrate into the substrate(s) (e.g., into the polymer(s) therein). In some cases, one or more nanostructures within the collection of nanostructures may become at least partially embedded in the first substrate and/or the second substrate (e.g., during a heating step). The embedded nanostructures and the substrates may together form a composite article comprising the substrates and the collection of nanostructures.

Figure 1C:
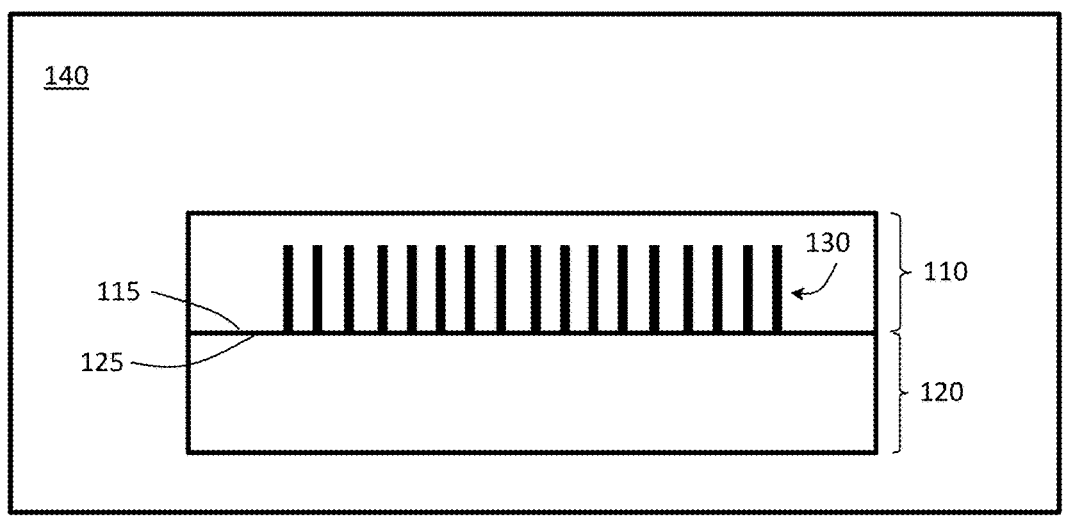

FIGS. 1B-1C show one way in which a composite article may be formed in accordance with a method described herein. In FIGS. 1B-1C, collection of nanostructures 130 becomes embedded in first substrate 110 during heating but does not become embedded in second substrate 120 during heating. As used herein, a collection of nanostructures is embedded in a substrate if it penetrates the joining surface of the substrate with another substrate. For example, and as will be described in further detail below, in FIG. 1C, collection of nanostructures 130 penetrates joining surface 115 of first substrate 110 and in FIG. 2C collection of nanostructures 130 penetrates joining surface 115 of first substrate 110 and joining surface 125 of second substrate 125. In some embodiments, a first material (e.g., a collection of nanostructures) may be embedded in a second material (e.g., a substrate) such that greater than or equal to 1% of the volume of the first material interpenetrates with the second material, greater than or equal to 2% of the volume of the first material interpenetrates with the second material, greater than or equal to 5% of the volume of the first material interpenetrates with the second material, greater than or equal to 10% of the volume of the first material interpenetrates with the second material, greater than or equal to 20% of the volume of the first material interpenetrates with the second material, or greater than or equal to 50% of the volume of the first material interpenetrates with the second material. In some embodiments, less than or equal to 100% of the volume of the first material interpenetrates with the second material, less than or equal to 50% of the volume of the first material interpenetrates with the second material, less than or equal to 20% of the volume of the first material interpenetrates with the second material, less than or equal to 10% of the volume of the first material interpenetrates with the second material, less than or equal to 5% of the volume of the first material interpenetrates with the second material, or less than or equal to 2% of the volume of the first material interpenetrates with the second material. Combinations of the above-referenced ranges are also possible (e.g., greater than or equal to 1% and less than or equal to 100%). Other ranges are also possible.

For example, in FIG. 1A (which shows a collection of nanostructures and two substrates prior to heating), the collection of nanostructures is not embedded in either first substrate or second substrate. The collection of nanostructures is not directly adjacent to either the first substrate or the second substrate, and so it does not penetrate with the joining surface of either the first substrate or the second substrate. Therefore, it is not embedded in either the first substrate or the second substrate. In FIGS. 1B-1C, collection of nanostructures is embedded in the first substrate but not the second substrate. FIGS. 1B-1C depict the collection of nanostructures and substrates during and/or after heating. The collection of nanostructures is directly adjacent to the second substrate but does not penetrate the joining surface of the second substrate, therefore it is not embedded in the second substrate. The collection of nanostructures is directly adjacent to and penetrates the joining surface of the first substrate, and so it is embedded in the first substrate. In some embodiments, such as shown in FIGS. 1B-1C, each nanostructure in the collection of nanostructures becomes embedded in one or both of the first substrate and the second substrate during a heating process. In some embodiments, a portion of the collection of nanostructures may become embedded in the first substrate and/or the second substrate, and a portion of the nanostructures may not become embedded in either the first substrate or the second substrate during a heating process. For example, certain nanostructures within a collection of nanostructures may become embedded in the first substrate and/or the second substrate, and certain nanostructures within the collection of nanostructures may not become embedded in either the first substrate or the second substrate during a heating process.

In some embodiments, greater than or equal to 1% of the nanostructures in a collection of nanostructures may become embedded in a substrate during a heating process, greater than or equal to 2% of the nanostructures in a collection of nanostructures may become embedded in a substrate during a heating process, greater than or equal to 5% of the nanostructures in a collection of nanostructures becomes embedded in a substrate during a heating process, greater than or equal to 10% of the nanostructures in a collection of nanostructures becomes embedded in a substrate during a heating process, greater than or equal to 20% of the nanostructures in a collection of nanostructures becomes embedded in a substrate during a heating process, or greater than or equal to 50% of the nanostructures in a collection of nanostructures becomes embedded in a substrate during a heating process. In some embodiments, less than or equal to 100% of the nanostructures in a collection of nanostructures becomes embedded in a substrate during a heating process, less than or equal to 50% of the nanostructures in a collection of nanostructures becomes embedded in a substrate during a heating process, less than or equal to 20% of the nanostructures in a collection of nanostructures becomes embedded in a substrate during a heating process, less than or equal to 10% of the nanostructures in a collection of nanostructures becomes embedded in a substrate during a heating process, less than or equal to 5% of the nanostructures in a collection of nanostructures becomes embedded in a substrate during a heating process, or less than or equal to 2% of the nanostructures in a collection of nanostructures becomes embedded in a substrate during a heating process. Combinations of the above-referenced ranges are also possible (e.g., greater than or equal to 1% and less than or equal to 100%). Other ranges are also possible.

In the embodiments shown in FIGS. 1A-1C, the arrangement of the collection of nanostructures with respect to the second substrate after the heating is substantially the same as its arrangement with respect to the second substrate prior to heating. However, the arrangement of the collection of nanostructures with respect to the first substrate is changed over the course of the heating. The collection of nanostructures may become selectively embedded in one substrate to which it is adjacent but not another by, for example, heating the substrate into which embedding is desired but not heating the other substrate and/or providing one substrate that is more compliant than the other substrate and/or comprises polymer with a higher tendency to flow than the polymer in the other substrate. It should be understood that although FIGS. 1B-1C show a method in which the collection of nanostructures becomes embedded in the first layer and not the second layer during heating, embodiments in which the collection of nanostructures becomes embedded in the second layer but not the first layer during heating are also contemplated.

Figure 2A:
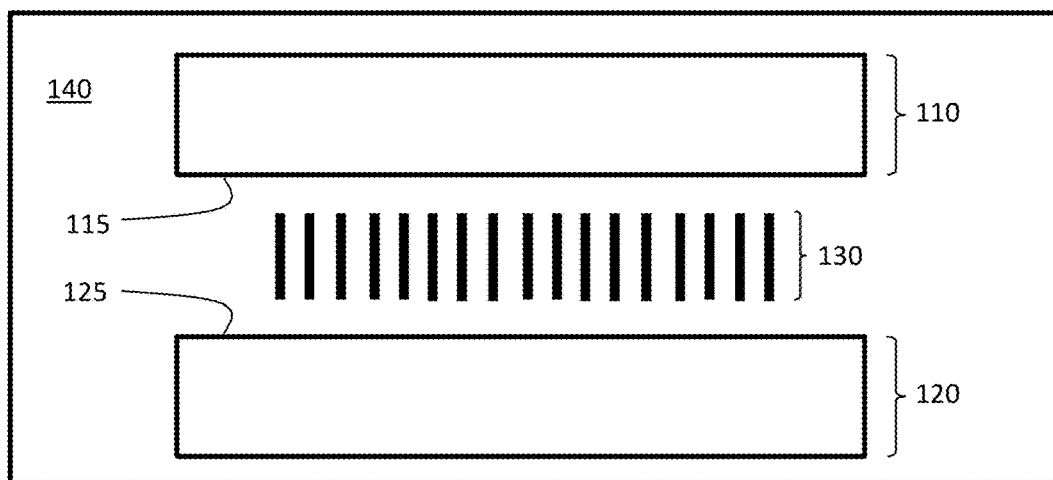
FIGS. 2A-2C depict a non-limiting embodiment of a method forming a composite article in accordance with certain embodiments.
Figure 2B:
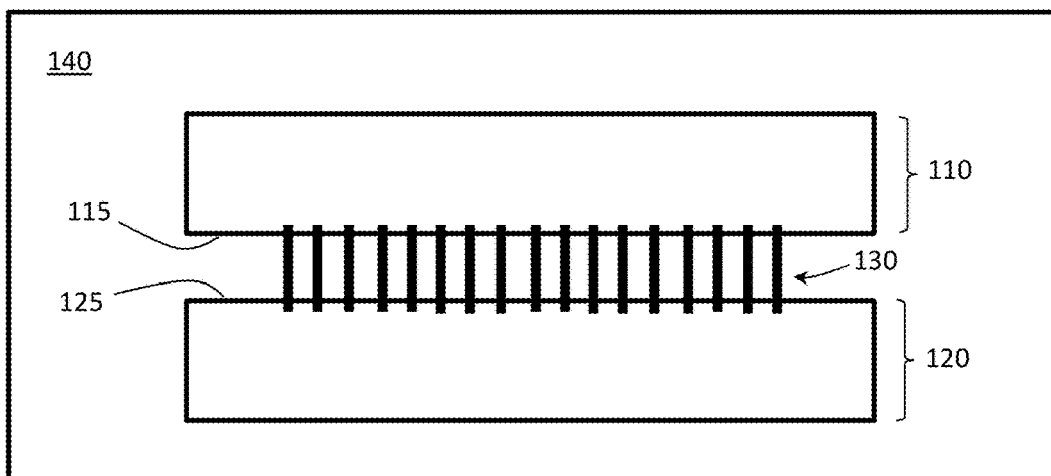
Figure 2C:
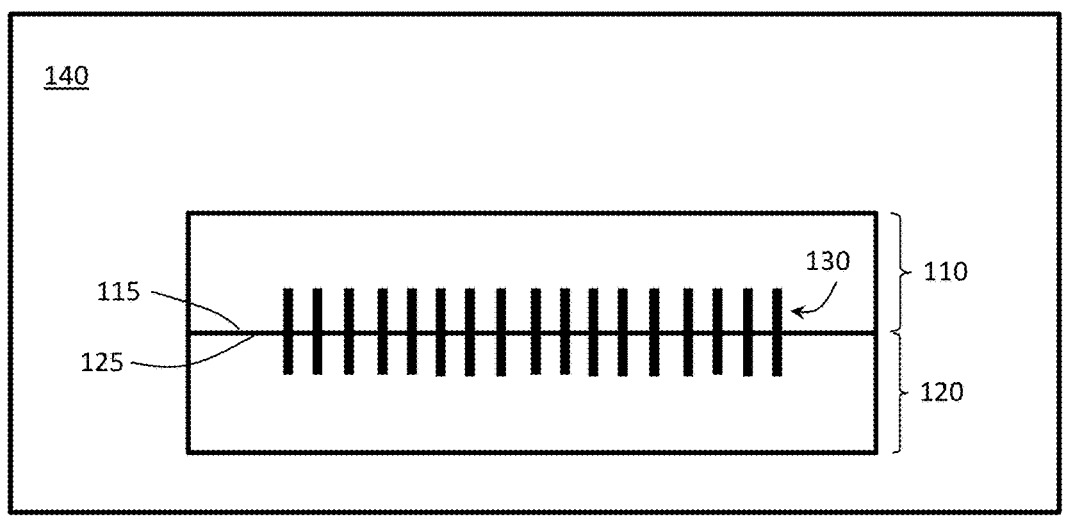

FIGS. 2B-2C show another way in which a composite article may be formed in accordance with a method described herein. In FIGS. 2B-2C, collection of nanostructures 130 becomes embedded in both first substrate 110 and second substrate 120 during heating. In some embodiments (e.g., as shown in FIG. 2C), the relative extents to which the collection of nanostructures become embedded in the first layer and second layer during heating may be substantially similar. However, in other embodiments the collection of nanostructures may become embedded in both the first substrate and the second substrate during heating, but may become embedded in the second substrate to a greater extent than in the first substrate or may become embedded in the first substrate to a greater extent than in the second substrate. In some embodiments, the degree to which the collection of nanostructures is more embedded in the first substrate than the second substrate (e.g., during heating, after heating) may vary spatially. For example, the collection of nanostructures may be embedded in the first substrate to a greater extent than in the second substrate in certain portions of the composite article and may be embedded in the second substrate to a greater extent than in the first substrate in other portions of the composite article. As another example, the collection of nanostructures may be solely embedded in the first substrate in some portions of the composite article and embedded in both the first substrate and the second substrate in other portions of the composite article. As a third example, the collection of nanostructures may be solely embedded in the first substrate in some portions of the composite article and solely embedded in the second substrate in other portions of the composite article. As a fourth example, in some embodiments a portion of the nanostructures in the collection of nanostructures may become embedded in the first substrate but not the second substrate, a portion of the nanostructures in the collection of nanostructures may become embedded in the second substrate but not the first substrate, and/or a portion of the nanostructures in the collection of nanostructures may become embedded in both the first substrate and the second substrate.

It should be understood that the dimensions of the first substrate, second substrate, collection of nanostructures, and the like are exemplary and that other relative lengths, thicknesses, etc. for these features are also contemplated.

In some embodiments, heat may be provided to a first substrate and/or a second substrate in a manner that is not spatially uniform and/or that is not temporally uniform. For example, in some embodiments, certain portions of the first substrate and/or second substrate may be heated before other portions of the first substrate and/or second substrate. Without wishing to be bound by any particular theory, it is believed that the portions of the substrate(s) that are heated will melt and/or soften (e.g., will experience a reduction in absolute viscosity), while those that are not heated will not melt and/or soften. The collection of nanostructures may become embedded in the melted and/or softened portions of the substrate(s) prior to the unmelted and/or non-softened portions of the substrates. By judiciously selecting the order in which different portions of the substrate(s) are heated, one of ordinary skill in the art performing the methods described herein may select the order in which the different portions of the substrate(s) begin to comprise embedded nano structures.

It is believed that embedding a collection of nanostructures in certain portions of one or more substrate(s) before other portions of the substrate(s) (e.g., during heating) may have one or more advantages. For example, when certain portions of the collection of nanostructures become embedded sequentially, relatively few or substantially no voids may be present at the conclusion of the embedding process. Any voids that form as a given portion of the collection of nanostructures becomes embedded may be formed around the edges of the embedded portions. As these portions then become heated and the nanostructures therein become embedded in the substrate(s), the voids (if any) may move towards the edges of newly embedded portions. If this process continues throughout the embedding process, any voids formed during embedding may move to the last portion(s) of the substrate(s) into which the collection of nanostructures becomes embedded. If these portions are on one or more edges and/or corners of the substrate(s), the voids may be eliminated through the edges and/or corners of the substrate(s) when the embedding concludes. By contrast, if the substrate(s) are heated uniformly, the collection of nanostructures may become embedded in the substrate(s) in a random and/or nonuniform manner. Voids may form at any and/or multiple location(s) within the substrate(s), and may become trapped if there is not a pathway for their escape.

Figure 3A:
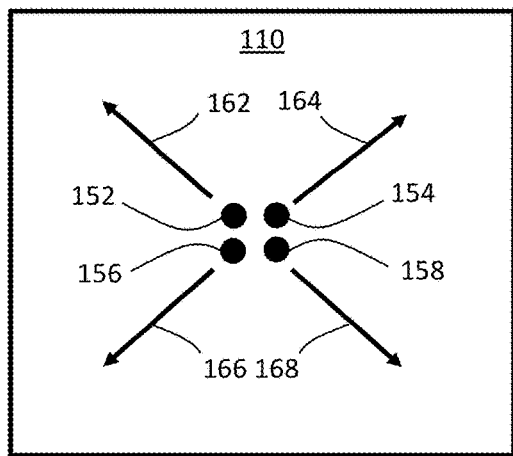
FIGS. 3A-3C depict a non-limiting embodiment of a method of heating a substrate in accordance with certain embodiments.
Figure 3A:
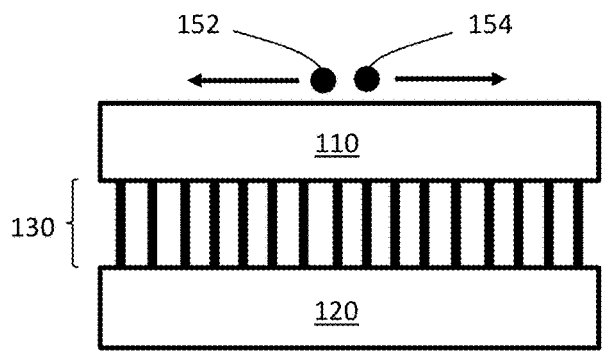
Figure 3B:
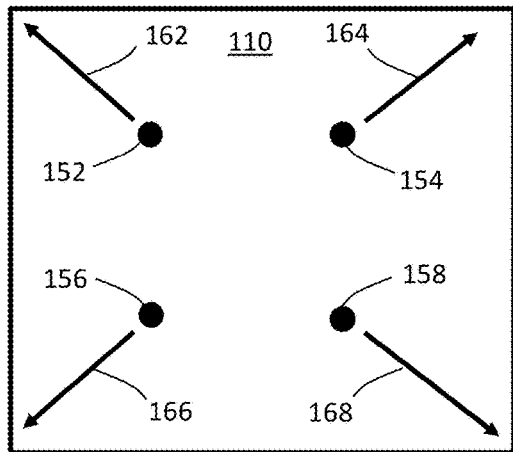
Figure 3B:
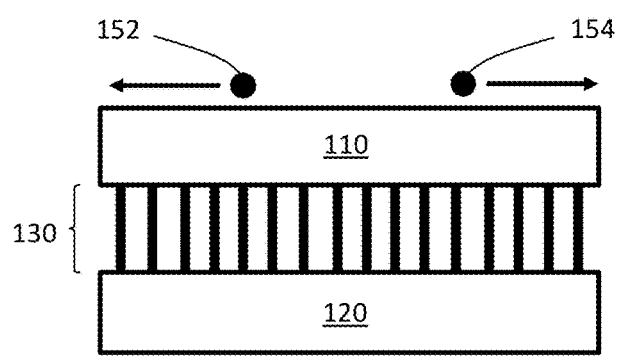
Figure 3C:
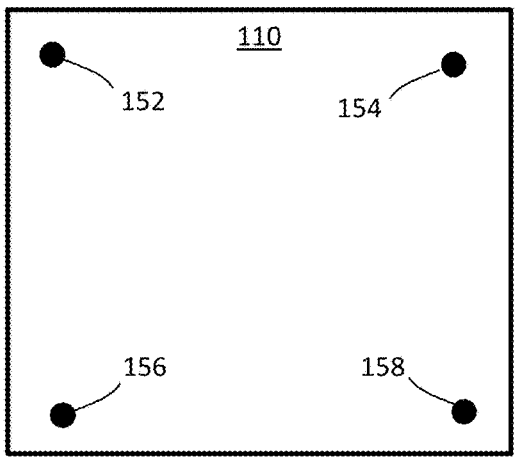
Figure 3C:
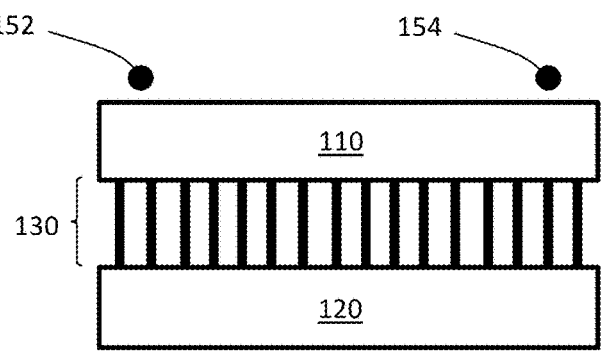

FIGS. 3A-3C show one exemplary method of heating a substrate. In FIGS. 3A-3C, first substrate 110 is heated by sources of heat 152, 154, 156, and 158. Heating of the first substrate is initiated by positioning the sources of heat above the center of the first substrate. Then, the sources of heat are moved outwards from the center of the first substrate along paths 162, 164, 166, and 168 until they reach an outer boundary of the first substrate. The sources of heat initially heat the center of the first substrate, and heat portions of the first substrate that are further from the center as they are moved outwards. In other words, heating the first substrate and/or the second substrate may comprise moving a source of the heat laterally across the first substrate and/or the second substrate. In some embodiments, and as is shown in FIGS. 3A-3C, heating may be initiated by two or more sources of heat in close proximity to each other. For example, in some cases all of the sources of heat may be positioned in close proximity to each other, and may be moved outwards from a common starting point. In other embodiments, heating may be initiated by a set of sources of heat that are not in close proximity to each other. Any suitable number, size, and shape of sources of heat may be employed. In some embodiments, there may be four sources of heat (e.g., as is shown in FIGS. 3A-3C); in other embodiments, more than four or fewer than four sources of heat may be employed. In some embodiments (e.g., also as is shown in FIGS. 3A-3C), the paths along which the sources of heat are moved may be at 90° angles relative to each other (and/or at angles that are equal to 360° divided by the total number of heating elements or total number of heating elements located in close proximity to each other). In other embodiments, the sources of heat may be moved at other angles relative to each other. The sources of heat may be any suitable sources of heat (e.g., resistive heating elements, sources of microwave radiation, heated fluids, lasers, and the like).

Figure 4A:
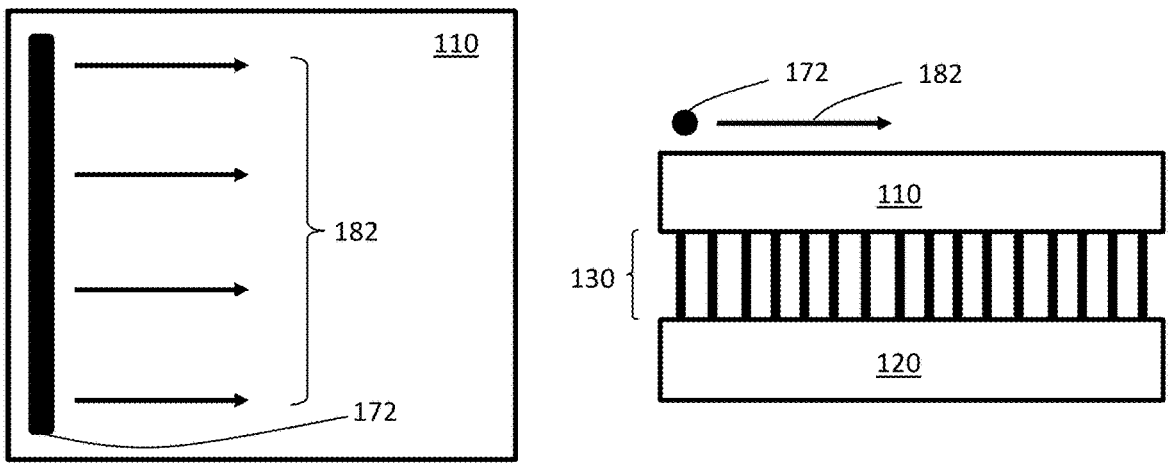
FIGS. 4A-4C depict a non-limiting embodiment of a method of heating a substrate in accordance with certain embodiments.
Figure 4B:
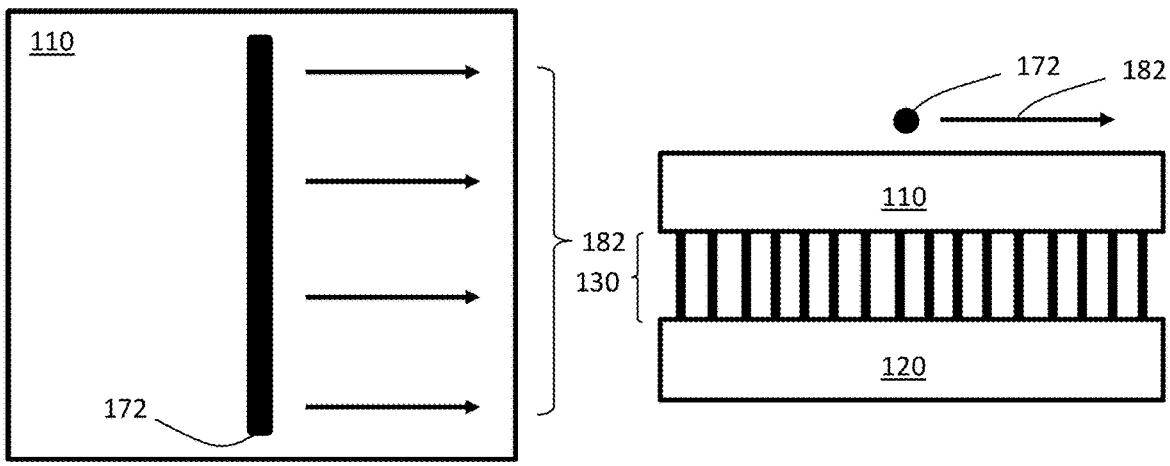
Figure 4C:
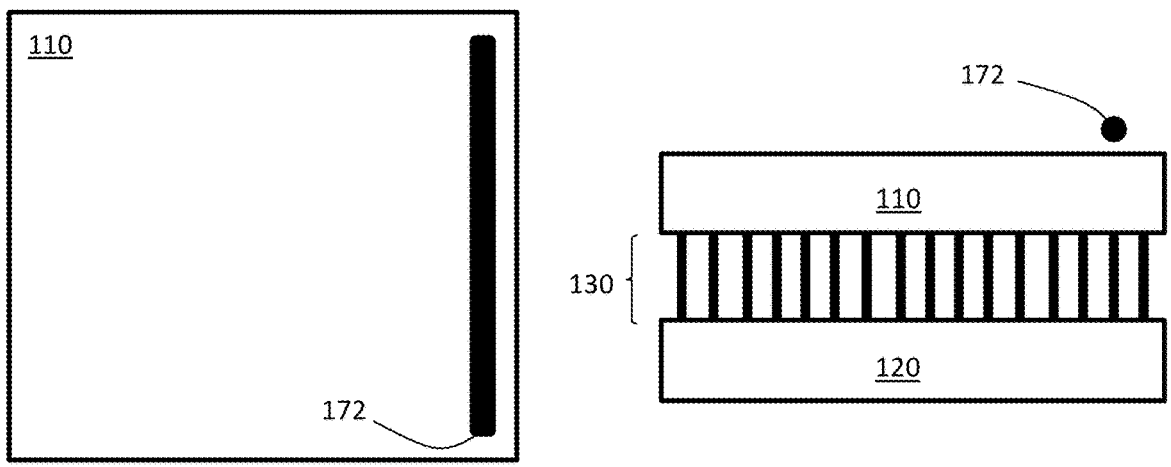

FIGS. 4A-4C show a second exemplary method of heating a substrate. In FIGS. 4A-4C, first substrate 110 is heated by source of heat 172. Source of heat 172 is initially positioned along a first edge of first substrate 110, and is moved (e.g., laterally) across first substrate 110 along path 182 until it reaches the opposite edge of first substrate 110. The source of heat initially heats the first edge of the first substrate, and heats subsequent portions of the first substrate as it is translated over them.

Other methods of heating different portions of one or more substrate(s) in a desired order are also possible. For example, in some cases the substrate(s) may be translated with respect to a stationary source of heat. As another example, the heating element may be activated at different positions to different extents as a function of time. In such embodiments, one or both of the source of heat and the substrate(s) may optionally be stationary while different portions of the substrate(s) are heated at different times. It should also be noted that both a first substrate and a second substrate may be heated (e.g., simultaneously, sequentially, in portions that are aligned with each other, in portions that are unaligned with each other, etc.).

As described above, certain embodiments relate to methods in which collections of nanostructures are employed. As used herein, the term "nanostructure" refers to an object having at least one cross-sectional dimension of less than 1 micron. In some embodiments, the nanostructure has at least one cross-sectional dimension of less than 500 nm, less than 250 nm, less than 100 nm, less than 75 nm, less than 50 nm, less than 25 nm, less than 10 nm, or, in some cases, less than 1 nm. Nanostructures described herein may have, in some cases, a maximum cross-sectional dimension of less than 1 micron, less than 500 nm, less than 250 nm, less than 100 nm, less than 75 nm, less than 50 nm, less than 25 nm, less than 10 nm, or, in some cases, less than 1 nm.

In some embodiments, a collection of nanostructures may comprise elongated nanostructures. As used herein, the term "elongated nanostructure" refers to a structure having a maximum cross-sectional dimension of less than or equal to 1 micron and a length resulting in an aspect ratio greater than or equal to 10. In some embodiments, the elongated nanostructure can have an aspect ratio greater than or equal to 100, greater than or equal to 1000, greater than or equal to 10,000, or greater. Those skilled in the art would understand that the aspect ratio of a given structure is measured along the longitudinal axis of the elongated nanostructure, and is expressed as the ratio of the length of the longitudinal axis of the nanostructure to the maximum cross-sectional dimension of the nanostructure. The "longitudinal axis" of an article corresponds to the imaginary line that connects the geometric centers of the cross-sections of the article as a pathway is traced, along the longest length of the article, from one end to another.

In some cases in which a collection of nanostructures comprises elongated nanostructures, the elongated nanostructure may have a maximum cross-sectional dimension of less than 1 micron, less than 100 nanometers, less than 50 nanometers, less than 25 nanometers, less than 10 nanometers, or, in some cases, less than 1 nanometer. A "maximum cross-sectional dimension" of an elongated nanostructure, as used herein, refers to the largest dimension between two points on opposed outer boundaries of the elongated nanostructure, as measured perpendicular to the length of the elongated nanostructure (e.g., the length of a carbon nanotube). The "average of the maximum cross-sectional dimensions" of a plurality of structures refers to the number average.

In some cases in which a collection of nanostructures comprises elongated nanostructures, the elongated nanostructure can have a cylindrical or pseudo-cylindrical shape. In some embodiments, the elongated nanostructure can be a nanotube, such as a carbon nanotube. Other examples of elongated nanostructures include, but are not limited to, nanofibers and nanowires.

Elongated nanostructures can be single molecules (e.g., in the case of some nanotubes) or can include multiple molecules bound to each other (e.g., in the case of some nanofibers).

Nanostructures (whether elongated nanostructures or not) may be formed of a variety of materials, in some embodiments. In certain embodiments, the nanostructures (e.g., elongated nanostructures) comprise carbon (e.g., carbon-based nanostructures, described in more detail below). Other non-limiting examples of materials from which nanostructures (e.g., elongated nanostructures) may be formed include silicon, indium-gallium-arsenide materials, boron nitride, silicon nitride (e.g., $Si_3N_4$), silicon carbide, dichalcogenides ($WS_2$), oxides (e.g., titanium dioxide, molybdenum trioxide), boron-carbon-nitrogen compounds (e.g., $BC_2N_2$, $BC_4N$), and polymers. In some embodiments, the nanostructures (e.g., elongated nanostructures) may be formed of one or more inorganic materials. Non-limiting examples include semiconductor nanowires such as silicon (Si) nanowires, indium-gallium-arsenide (InGaAs) nanowires, and nanotubes comprising boron nitride (BN), silicon nitride ($Si_3N_4$), silicon carbide (SiC), dichalcogenides such as ($WS_2$), oxides such as titanium dioxide ($TiO_2$) and molybdenum trioxide ($MoO_3$), and boron-carbon-nitrogen compositions such as $BC_2N_2$ and $BC_4N$. In some embodiments, the nanostructures comprise polymer nanofibers.

According to certain embodiments, a collection of nanostructures comprises elongated nanostructures having lengths of at least 5 microns, at least 10 microns, at least 100 microns, at least 1 mm, at least 5 mm, at least 10 mm, or at least 100 mm (and/or, in certain embodiments, up to 200 mm, up to 500 mm, up to 1 m, or longer). According to some embodiments, at least 50%, at least 75%, at least 90%, at least 95%, or at least 99% of the nanostructures in the collection of nanostructures may be elongated nanostructures and/or have lengths of at least 5 microns, at least 10 microns, at least 100 microns, at least 1 mm, at least 5 mm, at least 10 mm, or at least 100 mm (and/or, in certain embodiments, up to 200 mm, up to 500 mm, up to 1 m, or longer).

In some embodiments, a collection of nanostructures may comprise carbon-based nanostructures. As used herein, the term "carbon-based nanostructure" refers to articles having a fused network of aromatic rings, at least one cross-sectional dimension of less than 1 micron, and comprising at least 30% carbon by mass. In some embodiments, the carbon-based nanostructures may comprise at least 40%, at least 50%, at least 60%, at least 70%, at least 80%, at least 90%, or at least 95% of carbon by mass, or more. The term "fused network" would not include, for example, a biphenyl group, wherein two phenyl rings are joined by a single bond and are not fused. Examples of carbon-based nanostructures include carbon nanotubes (e.g., single-walled carbon nanotubes, double-walled carbon nanotubes, multi-walled carbon nanotubes, etc.), carbon nanowires, carbon nanofibers, carbon nanoshells, graphene, fullerenes, and the like. In some embodiments, the carbon-based nanostructures comprise hollow carbon nanoshells and/or nanohorns.

In some embodiments, a carbon-based nanostructure may have at least one cross-sectional dimension of less than 500 nm, less than 250 nm, less than 100 nm, less than 75 nm, less than 50 nm, less than 25 nm, less than 10 nm, or, in some cases, less than 1 nm. Carbon-based nanostructures described herein may have, in some cases, a maximum cross-sectional dimension of less than 1 micron, less than 500 nm, less than 250 nm, less than 100 nm, less than 75 nm, less than 50 nm, less than 25 nm, less than 10 nm, or, in some cases, less than 1 nm.

According to certain embodiments, a collection of nanostructures may comprise carbon-based nanostructures that are elongated carbon-based nanostructures. As used herein, the term "elongated carbon-based nanostructure" refers to a carbon-based nanostructure structure having a maximum cross-sectional dimension of less than or equal to 1 micron and a length resulting in an aspect ratio greater than or equal to 10. In some embodiments, the elongated nanostructure can have an aspect ratio greater than or equal to 100, greater than or equal to 1000, greater than or equal to 10,000, or greater. As noted above, those skilled in the art would understand that the aspect ratio of a given structure is measured along the longitudinal axis of the elongated nanostructure, and is expressed as the ratio of the length of the longitudinal axis of the nanostructure to the maximum cross-sectional dimension of the nanostructure.

In some cases, a collection of nanostructures may comprise elongated carbon-based nanostructure with a maximum cross-sectional dimension of less than 1 micron, less than 100 nanometers, less than 50 nanometers, less than 25 nanometers, less than 10 nanometers, or, in some cases, less than 1 nanometer. As noted above, the "maximum cross-sectional dimension" of an elongated nanostructure, as used herein, refers to the largest dimension between two points on opposed outer boundaries of the elongated nanostructure, as measured perpendicular to the length of the elongated nanostructure (e.g., the length of a carbon nanotube). As noted above, the "average of the maximum cross-sectional dimensions" of a plurality of structures refers to the number average.

In some cases, a collection of nanostructures may comprise elongated carbon-based nanostructure with a cylindrical or pseudo-cylindrical shape, in some embodiments. In some embodiments, the elongated carbon-based nanostructure can be a carbon nanotube. Other examples of elongated carbon-based nanostructures include, but are not limited to, carbon nanofibers and carbon nanowires.

In some embodiments, a collection of carbon-based nanostructures may comprise carbon nanotubes. As used herein, the term "carbon nanotube" is given its ordinary meaning in the art and refers to a substantially cylindrical molecule or nanostructure comprising a fused network of primarily six-membered rings (e.g., six-membered aromatic rings) comprising primarily carbon atoms. In some cases, carbon nanotubes may resemble a sheet of graphite formed into a seamless cylindrical structure. In some cases, carbon nanotubes may include a wall that comprises fine-grained sp2 sheets. In certain embodiments, carbon nanotubes may have turbostratic walls. It should be understood that the carbon nanotube may also comprise rings or lattice structures other than six-membered rings. Typically, at least one end of the carbon nanotube may be capped, i.e., with a curved or nonplanar aromatic structure. Carbon nanotubes may have a diameter of the order of nanometers and a length on the order of millimeters, or, on the order of tenths of microns, resulting in an aspect ratio greater than 100, 1000, 10,000, 100,000, $10^6$, $10^7$, $10^8$, $10^9$, or greater. Examples of carbon nanotubes include single-walled carbon nanotubes (SWNTs), double-walled carbon nanotubes (DWNTs), multi-walled carbon nanotubes (MWNTs) (e.g., concentric carbon nanotubes), inorganic derivatives thereof, organic derivatives thereof, and the like. In some embodiments, the carbon nanotube is a single-walled carbon nanotube. In some cases, the carbon nanotube is a multi-walled carbon nanotube (e.g., a double-walled carbon nanotube). In some cases, the carbon nanotube comprises a multi-walled or single-walled carbon nanotube with an inner diameter wider than is attainable from a traditional catalyst or other active growth material. In some cases, the carbon nanotube may have a diameter less than 1 micron, less than 500 nm, less than 250 nm, less than 100 nm, less than 50 nm, less than 25 nm, less than 10 nm, or, in some cases, less than 1 nm.

In some embodiments, a collection of nanostructures may comprise a forest of elongated nanostructures. As used herein, a "forest" of elongated nanostructures corresponds to a plurality of elongated nanostructures arranged in side-by-side fashion with one another. In some embodiments, the forest of elongated nanostructures comprises at least 5, at least 10, at least 50, at least 100, at least 500, at least 1000, or at least 10,000 elongated nanostructures. In some such embodiments, the forest of elongated nanostructures may comprise at least $10^6$, at least $10^7$, at least $10^8$, at least $10^9$, at least $10^{10}$, at least $10^{11}$, at least $10^{12}$, or at least $10^{13}$ elongated nanostructures. Those of ordinary skill in the art are familiar with suitable methods for forming forests of elongated nanostructures. For example, in some embodiments, the forest of elongated nanostructures can be catalytically grown (e.g., using a growth catalyst deposited via chemical vapor deposition process). In some embodiments, the as-grown forest can be used as is, while in other cases, the as-grown forest may be mechanically manipulated after growth and prior to subsequent processing steps described elsewhere herein (e.g., folding, shearing, compressing, buckling, etc.).

In some embodiments, a collection of nanostructures (e.g., a forest of elongated nanostructures) may be provided as a self-supporting material. As used herein, a "self-supporting" material refers to a material having sufficient stability or rigidity to maintain its structural integrity (e.g., shape) without external support along surfaces of the material.

Figure 5A:
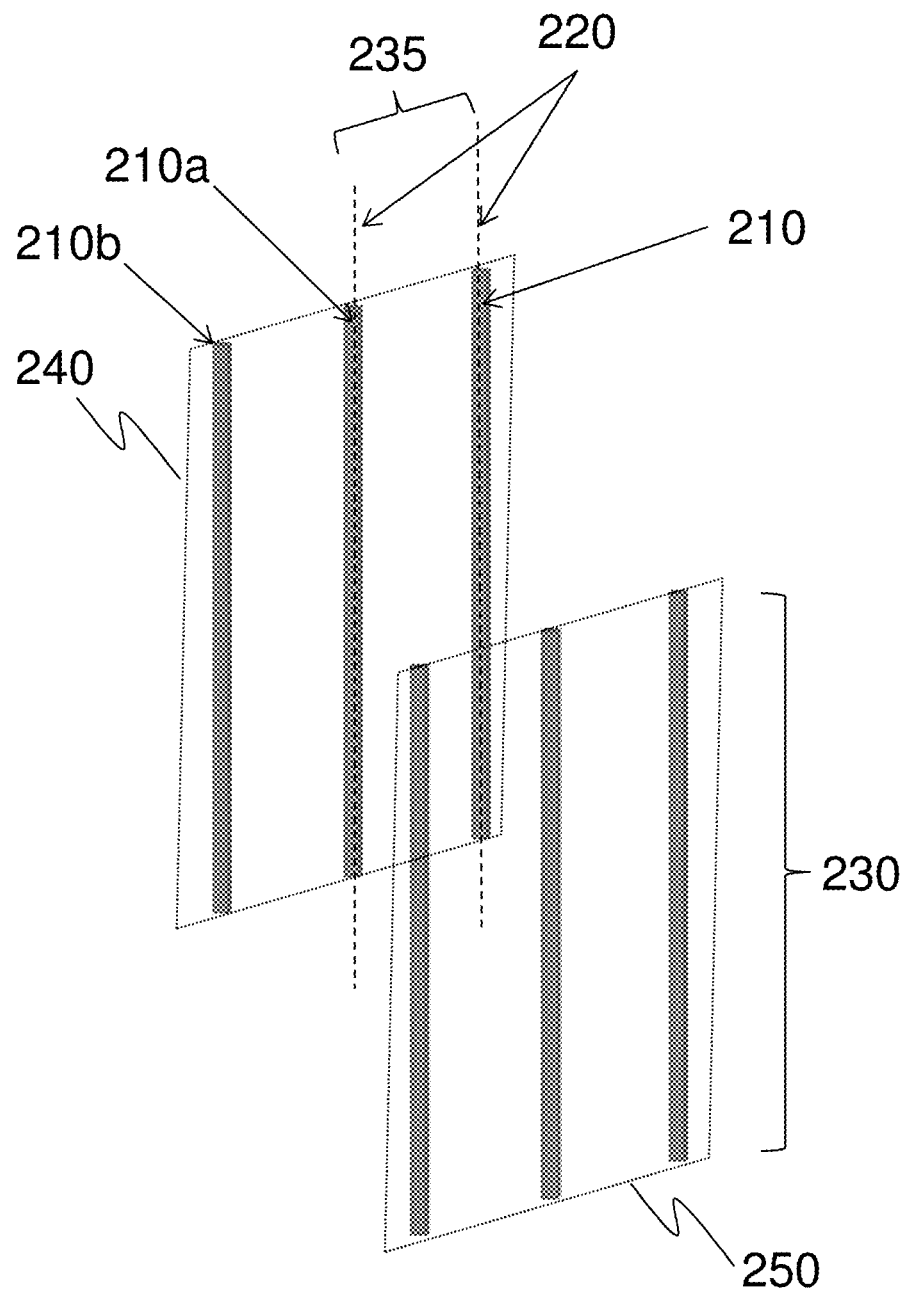
FIGS. 5A-5C each depict portions of forests of nanostructures in accordance with certain embodiments.

For a given nanostructure in a collection of nanostructures (e.g., an elongated nanostructure in a forest of elongated nanostructures), the "nearest neighbor" corresponds to the nanostructure having a longitudinal axis that is closest to the longitudinal axis of the given nanostructure at any point along the longitudinal axis of the given elongated nanostructure. For example, as illustrated in FIG. 5A, elongated nanostructure 210 has nearest neighbor elongated nanostructure 210a. By way of example, elongated nanostructure 210 is not a nearest neighbor with elongated nanostructure 210b.

In some embodiments, a collection of nanostructures may have an advantageous number average nearest neighbor distance. In certain cases, a nearest neighbor distance between two nanostructures may be equivalent to a number average cross-sectional dimension of a channel between the two nanostructures, such as a channel into which a polymer within a substrate may penetrate during a step of embedding the collection of nanostructures into the substrate. The number average nearest neighbor distance of the collection of nanostructures may therefore be equivalent to the number average cross-sectional dimension of the channels in the collection of nanostructures. Without wishing to be bound by any particular theory, it is believed that the cross-sectional dimension of a channel affects the magnitude of the capillary force that it may apply, and so the number average nearest neighbor distance may influence the magnitude of the capillary forces applied by the collection of nanostructures on any substrates to which it is adjacent.

In certain embodiments, a collection of nanostructures (e.g., a forest of elongated nanostructures, such as those shown in FIGS. 1A-4C) has a number average of nearest neighbor distances that is less than 2.5%, less than 1%, less than 0.5%, less than 0.25%, less than 0.1%, or less than 0.05% of the average length of the nanostructures within the collection of nanostructures. For example, as illustrated in FIG. 5A, a forest of elongated nanostructures 200 may have a nearest neighbor distance between two elongated nanostructures 235 (e.g., between elongated nanostructure 210 and elongated nanostructure 210a) and an average length 230. In some embodiments, the number average of nearest neighbor distances within the collection of nanostructures is less than 250 nanometers, less than 200 nanometers, less than 150 nanometers, less than 100 nanometers, less than 50 nanometers, less than 25 nanometers, less than 10 nanometers, less than 5 nanometers, or less than or equal to 2 nm. In certain embodiments, the number average of nearest neighbor distances within the forest of elongated nanostructures is greater than or equal to 1 nm, greater than or equal to 2 nanometers, greater than or equal to 5 nanometers, greater than or equal to 10 nanometers, greater than or equal to 25 nanometers, greater than or equal to 50 nanometers, greater than or equal to 100 nanometers, greater than or equal to 150 nanometers, or greater than or equal to 200 nanometers. Combinations of the above-referenced ranges are also possible (less than 250 nanometers and greater than or equal to 2 nanometers, or less than or equal to 100 nm and greater than or equal to 1 nm). Other ranges are also possible. The number average of nearest neighbor distances within the collection of nanostructures may be calculated by determining the nearest neighbor distance for each nanostructure, then number averaging the nearest neighbor distances. Nearest neighbor distances of the nanostructures can be determined by 2- and 3-dimensional scanning and transmission electron tomography.

In some embodiments, the nearest neighbor distance within a collection of nanostructures (e.g., a forest of elongated nanostructures) is roughly equal for each nanostructure. For example, as illustrated in FIG. 5A, nearest neighbor distance 235 is roughly equal between all nearest neighbor elongated nanostructures in the forest. In other embodiments, the nearest neighbor distances for each nanostructure may vary.

Figure 5B:
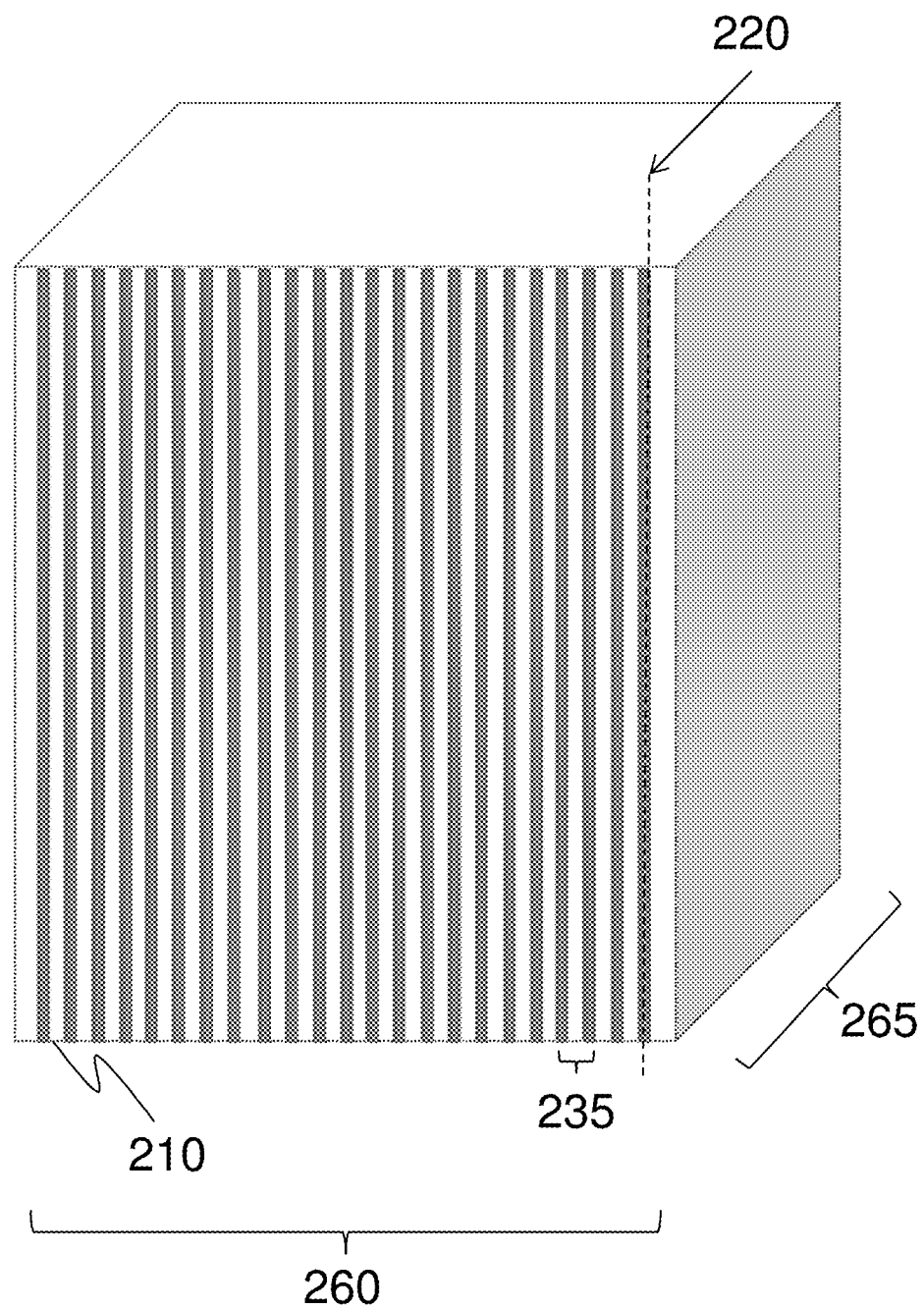

In some embodiments, a collection of nanostructures (e.g., a forest of elongated nanostructures, such as those shown in FIGS. 1A-4C) extends a distance, in each of two orthogonal directions each perpendicular to the longitudinal axes of the nanostructures therein, that is at least 10 times greater than the number average of nearest neighbor distances within the collection of nanostructures. For example, as shown in FIG. 5B, a forest of elongated nanostructures 202 (comprising elongated nanostructures 210) extends a first distance 260 and a second distance 265. Each of the first distance and the second distance extend in two orthogonal directions, each perpendicular to the longitudinal axes of the nanostructures 220. In some such embodiments, first distance 260 and second distance 265 are each at least 10 times greater than the number average of the nearest neighbor distances within the forest.

In some cases, a collection of nanostructures (e.g., a forest of elongated nanostructures) extends, in two orthogonal directions each perpendicular to the long axes, a distance at least 100 times greater, at least 1000 times greater, at least 10,000 times greater or longer than the number average of the nearest neighbor distances within the collection of nanostructures. In certain embodiments, the collection of nanostructures extends, in at least one of two orthogonal directions each perpendicular to the long axes, a distance at least $10^6$ times, at least $10^7$ times $10^8$ times, at least $10^9$ times, or at least $10^{10}$ times greater or longer than the number average of nearest neighbor distances within the collection of nanostructures forest.

In some cases, a collection of nanostructures (e.g., a forest of elongated nanostructures) may be provided such that the collection of nanostructures extends, in at least one dimension (e.g., in one dimension, in two orthogonal dimensions, etc.) substantially perpendicular to the long axes, a distance at least 1.5 times greater, at least 2 times greater, at least 5 times greater, at least 10 times greater, at least 25 times greater, at least 100 times greater, or more than a dimension substantially parallel to the longitudinal axes of the nanostructures therein (e.g., elongated nanostructures therein). As a specific example, a forest of elongated nanostructures may constitute a thin-film such that the longitudinal axes of the nanostructures are substantially perpendicular to the largest surface of the film. For example, as illustrated in FIG. 5C, forest of elongated nanostructures 204 comprises elongated nanostructures 210 and the long axes 220 of the nanostructures is substantially parallel to the largest surface 270 of the film.

Figure 5C:
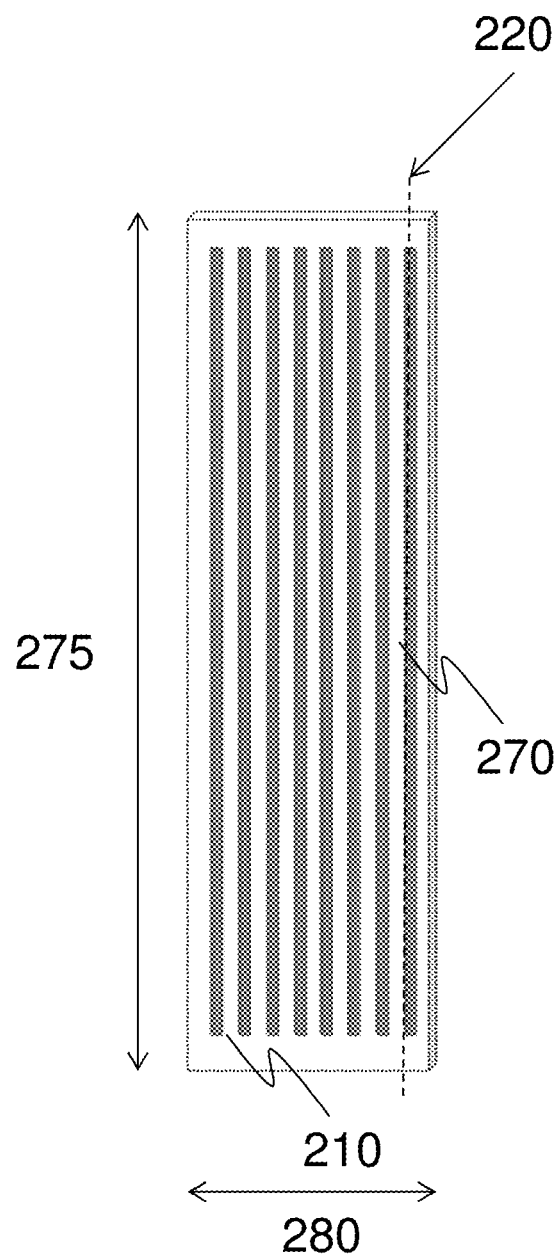

A collection of nanostructures (e.g., a forest of elongated nanostructures) may be provided, in some instances, such that the collection of nanostructures extends, in at least one dimension substantially parallel to the long axes (e.g., dimension 275 in FIG. 5C), a distance at least 1.5 times greater, at least 2 times greater, at least 5 times greater, at least 10 times greater, at least 25 times greater, at least 100 times greater, or more than a dimension substantially perpendicular to the long axes of the nanostructures (e.g., dimension 280 in FIG. 5C). In an alternative embodiment, the collection of nanostructures may be provided such that the collection of nanostructures extends, in at least one dimension substantially perpendicular to the long axes 270 (e.g., dimension 280 in FIG. 5C), a distance at least 1.5 times greater, at least 2 times greater, at least 5 times greater, at least 10 times greater, at least 25 times greater, at least 100 times greater, or more than a dimension substantially parallel to the long axes 270 of the nanostructures (e.g., dimension 275 in FIG. 5C).

For example, the collection of nanostructures may extend a distance of greater than or equal to 100 nm in at least one of two orthogonal directions each perpendicular to the long axes, greater than or equal to 1 micron in at least one of two orthogonal directions each perpendicular to the long axes, greater than or equal to 10 microns in at least one of two orthogonal directions each perpendicular to the long axes, greater than or equal to 100 microns in at least one of two orthogonal directions each perpendicular to the long axes, greater than or equal to 1 mm in at least one of two orthogonal directions each perpendicular to the long axes, greater than or equal to 10 mm in at least one of two orthogonal directions each perpendicular to the long axes, greater than or equal to 100 mm in at least one of two orthogonal directions each perpendicular to the long axes, greater than or equal to 1 m in at least one of two orthogonal directions each perpendicular to the long axes, or greater than or equal to 10 m in at least one of two orthogonal directions each perpendicular to the long axes. The collection of nanostructures may extend for a distance of less than or equal to 100 m in at least one of two orthogonal directions each perpendicular to the long axes, extend for a distance of less than or equal to 10 m in at least one of two orthogonal directions each perpendicular to the long axes, extend for a distance of less than or equal to 1 m in at least one of two orthogonal directions each perpendicular to the long axes, extend for a distance of less than or equal to 100 mm in at least one of two orthogonal directions each perpendicular to the long axes, extend for a distance of less than or equal to 10 mm in at least one of two orthogonal directions each perpendicular to the long axes, extend for a distance of less than or equal to 1 mm in at least one of two orthogonal directions each perpendicular to the long axes, extend for a distance of less than or equal to 100 microns in at least one of two orthogonal directions each perpendicular to the long axes, extend for a distance of less than or equal to 10 microns in at least one of two orthogonal directions each perpendicular to the long axes, or extend for a distance of less than or equal to 1 micron in at least one of two orthogonal directions each perpendicular to the long axes. Combinations of the above-referenced ranges are also possible (e.g., greater than or equal to 100 nm and less than or equal to 100 m). Other ranges are also possible.

In some cases, at least 10%, at least 20%, at least 30%, at least 40%, at least 50%, at least 60%, at least 70%, or more of nanostructures within a collection of nanostructures (e.g., elongated nanostructures within a forest of elongated nanostructures) extend substantially through the height of the collection (e.g., at least 90% of the maximum height of the collection) of nanostructures. The "height" of the collection of nanostructures corresponds to the dimension of the collection of nanostructures that is parallel to the longitudinal axes of the nanostructures.

According to certain embodiments, a collection of nanostructures may comprise nanostructures that are substantially aligned (e.g., substantially aligned elongated nanostructures within a forest of elongated nanostructures). Alignment of the elongated nanostructures as described herein can be determined by 3-dimensional electron tomography.

In some embodiments, at least 10%, at least 20%, at least 30%, at least 40%, at least 50%, at least 60%, at least 70%, at least 80%, or at least 90% of the nanostructures within a collection of nanostructures (e.g., elongated nanostructures within a forest of elongated nanostructures) are parallel to within 30 degrees, within 20 degrees, within 10 degrees, within 5 degrees, or within 2 degrees of a common vector.

Figure 6A:
FIG. 6A depicts a collection of nanostructures in accordance with certain embodiments.
Figure 6B:
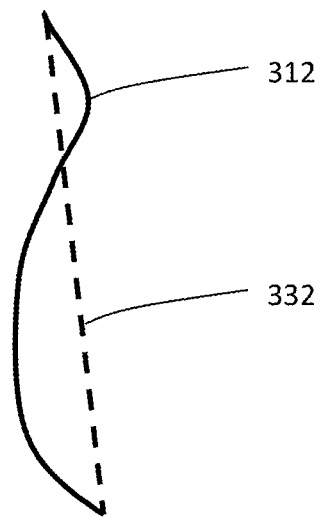
FIG. 6B depicts a nanostructure in accordance with certain embodiments.

For example, in FIG. 6A nanostructure 310 and common vector 330 form an angle indicated by reference numeral 320, which is less than 30 degrees in FIG. 6A. Those skilled in the art would understand that elongated nanostructures may have some inherent deviation along their length such as waviness. Accordingly, for the purposes of determining the alignment of elongated nanostructures with respect to a common vector, one would draw a line from one end of the elongated nanostructure to the other end of the elongated nanostructure. For example, in FIG. 6B the common vector of a collection of nanostructures comprising nanostructure 312 would be determined by line 332.

In some cases, a collection of nanostructures may comprise a high volume fraction of nanostructures. For example, the volume fraction of the nanostructures within the collection of nanostructures may be at least 0.001, at least 0.002, at least 0.005, at least 0.01, at least 0.02, at least 0.05, at least 0.1, at least 0.2, at least 0.4, at least 0.6, at least 0.7, at least 0.75, at least 0.78, or higher. The volume fraction of the nanostructures may be less than or equal to 0.8, less than or equal to 0.78, less than or equal to 0.75, less than or equal to 0.7, less than or equal to 0.6, less than or equal to 0.4, less than or equal to 0.2, less than or equal to 0.1, less than or equal to 0.05, or less than or equal to 0.02. Combinations of the above-referenced ranges are also possible (e.g., at least 0.001 and less than or equal to 0.8). Other ranges are also possible. (Those of ordinary skill in the art would understand that these volume fractions expressed in decimals would be multiplied by 100% determine percent volume. For example, a component having a volume fraction of 0.8 within an article would make up 80% of the volume of that article.)

In some embodiments, polymers may make up a relatively low volume fraction of a collection of nanostructures prior to a step in which the collection of nanostructures is embedded in a substrate (e.g., during a step in which it is provided, during a step in which it is arranged between two substrates). For instance, polymers may make up a volume fraction of the collection of nanostructures of less than or equal to 0.10, less than or equal to 0.05, less than or equal to 0.02, or less than or equal to 0.01. Polymers may make up a volume fraction of the collection of nanostructures of greater than or equal to 0.005, greater than or equal to 0.01, greater than or equal to 0.02, or greater than or equal to 0.05. Combinations of the above-referenced ranges are also possible (e.g., greater than or equal to 0.005 and less than or equal to 0.10). Other ranges are also possible.

In some embodiments, channels (e.g., pores) may make up a volume fraction of the collection of nanostructures that is complementary to the volume fraction of nanostructures in the collection of nanostructures prior to a step in which the collection of nanostructures is embedded in a substrate. In other words, the collection of nanostructures may include mainly nanostructures and channels therein prior to any embedding of the collection of nanostructures into any substrates. Prior to an embedding step, channels may make up a volume fraction of the collection of nanostructures of less than or equal to 0.999, less than or equal to 0.998, less than or equal to 0.995, less than or equal to 0.99, less than or equal to 0.98, less than or equal to 0.95, less than or equal to 0.9, less than or equal to 0.8, less than or equal to 0.6, less than or equal to 0.4, less than or equal to 0.3, less than or equal to 0.25, less than or equal to 0.22, or lower. Prior to an embedding step, channels may make up a volume fraction of the collection of nanostructures of greater than or equal to 0.2, greater than or equal to 0.22, greater than or equal to 0.25, greater than or equal to 0.3, greater than or equal to 0.4, greater than or equal to 0.6, greater than or equal to 0.8, greater than or equal to 0.9, greater than or equal to 0.95, greater than or equal to 0.98, greater than or equal to 0.99, greater than or equal to 0.995, or greater than or equal to 0.998. Combinations of the above-referenced ranges are also possible (e.g., less than or equal to 0.999 and greater than or equal to 0.2). Other ranges are also possible.

Polymers may make up any suitable volume fraction of a collection of nanostructures after a step in which the collection of nanostructures becomes at least partially embedded in one or more substrates. After the collection of nanostructures becomes at least partially embedded in one or more substrates, polymers may make up a volume fraction of the collection of nanostructures that is complementary to the volume fraction of nanostructures in the collection of nanostructures prior to a step in which the collection of nanostructures is embedded in a substrate after the collection of nanostructures has become embedded in one or more substrates. In other words, the collection of nanostructures may include mainly nanostructures and polymer after the nanostructures have become embedded in one or more substrates. After an embedding step, polymers may make up a volume fraction of the collection of nanostructures of less than or equal to 0.999, less than or equal to 0.998, less than or equal to 0.995, less than or equal to 0.99, less than or equal to 0.98, less than or equal to 0.95, less than or equal to 0.9, less than or equal to 0.8, less than or equal to 0.6, less than or equal to 0.4, less than or equal to 0.3, less than or equal to 0.25, less than or equal to 0.22, or lower. After an embedding step, polymers may make up a volume fraction of the collection of nanostructures of greater than or equal to 0.2, greater than or equal to 0.22, greater than or equal to 0.25, greater than or equal to 0.3, greater than or equal to 0.4, greater than or equal to 0.6, greater than or equal to 0.8, greater than or equal to 0.9, greater than or equal to 0.95, greater than or equal to 0.98, greater than or equal to 0.99, greater than or equal to 0.995, or greater than or equal to 0.998. Combinations of the above-referenced ranges are also possible (e.g., less than or equal to 0.999 and greater than or equal to 0.2). Other ranges are also possible.

In some embodiments, a collection of nanostructures described herein may exhibit a relatively large electrical conductivity. In some cases, the collection of nanostructures may exhibit a relatively large electrical conductivity in a particular direction. For example, in some embodiments, the collection of nanostructures exhibits a relatively large electrical conductivity measured in a direction substantially parallel to the longitudinal axes of the nanostructures therein (e.g., elongated nanostructures therein). In some embodiments, the collection of nanostructures may have an electrical conductivity of at least $10^{-4}$ S/m, $10^{-3}$ S/m, $10^{-2}$ S/m, 0.1 S/m, 1 S/m, 10 S/m, 100 S/m, $10^3$ S/m, $10^4$ S/m, or greater. Electrical conductivity, as described herein, may be determined using direct current impedance measurements.

As described above, certain embodiments relate to methods of forming composite articles by heating one or more substrates. In some embodiments, one or more of the substrates (e.g., a first substrate and/or a second substrate) comprises a prepreg. As used herein, the term "prepreg" refers to one or more layers of polymer (e.g., thermoset or thermoplastic resin) containing embedded fibers, for example fibers of carbon, glass, silicon carbide, and the like. In some embodiments, the thermoset material includes epoxy, rubber strengthened epoxy, BMI, PMK-15, polyesters, and/or vinylesters. In certain embodiments, the thermoplastic material includes polyamides, polyimides, polyarylene sulfide, polyetherimide, polyesterimides, polyarylenes, polysulfones, polyethersulfones, polyphenylene sulfide, polyetherimide, polypropylene, polyolefins, polyketones, polyetherketones, polyetherketoneketone, polyetheretherketones, and/or polyester. According to certain embodiments, the prepreg includes fibers that are aligned and/or interlaced (woven or braided). In some embodiments, the prepregs are arranged such the fibers of many layers are not aligned with fibers of other layers, the arrangement being dictated by directional stiffness requirements of the article to be formed. In certain embodiments, the fibers cannot be stretched appreciably longitudinally, and thus, each layer cannot be stretched appreciably in the direction along which its fibers are arranged. Exemplary prepregs include thin-ply prepregs, non-crimp fabric prepregs, TORLON thermoplastic laminate, PEEK (polyether etherketone, Imperial Chemical Industries, PLC, England), PEKK (polyetherketone ketone, DuPont) thermoplastic, T800H/3900 2 thermoset from Toray (Japan), and AS4/3501 6 thermoset from Hercules (Magna, Utah), IMA from Hexcel (Magna, Utah), IM7/M21 from Hexcel (Magna, Utah), IM7/977-3 from Hexcel (Magna, Utah), Cycom 5320-1 from Cytec (Woodland Park. N.J.), and AS4/3501 6 thermoset from Hexcel (Magna, Utah).

As also described above, one or more substrate(s) (e.g., a first substrate and/or a second substrate) may comprise a prepreg that is an autoclave prepreg. As used herein, an autoclave prepreg is a prepreg that is configured to be cured in an autoclave (i.e., it would be believed by one of ordinary skill in the art to have inferior properties if cured outside of an autoclave and/or at a pressure less than 3 bar). One of ordinary skill in the art would be capable of distinguishing autoclave prepregs from other prepregs. Non-limiting examples of autoclave prepregs include certain prepregs manufactured by Hexcel (e.g., part nos. M76, 913, 8551-7, ZM91, M21, 8552, M18, M18/1, 922-1, HT93, 200, M65, F655, 996, 954-3, 954-6, M35-4, M47, and M81), certain prepregs manufactured by Tencate (e.g., part nos. EX-1515, TC410, TC890, BTCy-2, EX-1522, C640, C740, E650, E720, E721-FR, E722, E726, E731, E732, RS-1, E745, E750, RS-17B, RS-3, E760, 8020, RS-51, 8020 Rapi-Ply, 8020-FR, BTCy-1, BTCy-1A, TC380, RS-8HT), certain prepregs manufactured by Cytec Solvay Group (e.g., part nos. CYCOM 381, CYCOM 919, CYCOM 934, CYCOM 950, CYCOM 970, CYCOM 985, CYCOM 997, CYCOM 2237, CYCOM 5216, CYCOM 7668, CYCOM 7701, CYCOM 7714, Avimid RB, CYCOM 5250-4, CYCOM 5250MC, CYCOM 5276-1, CYCOM 7714A, CYCOM 937A, CYCOM 5575-2, CYCOM 950-1, CYCOM 977-2, CYCOM 977-3, CYCOM 985 LV, Avimid N, Avimid R), certain prepregs manufactured by Toray (e.g., part nos. #2500, #2580-14, #2573, #2574, #2592, #3631-2, #3633, #3900-2B), and certain prepregs manufactured by Gurit (e.g., part nos. SC 110(T2), SC 160). Non-limiting examples of prepregs that are not autoclave prepregs include certain prepregs manufactured by Hexcel (e.g., part nos. M56, M26T, M92, M20, HT93, M9.X, M103, M104, M34, M49, M77, M79, 3H04), certain prepregs manufactured by Tencate (e.g., part nos. BT250E-1, BT250E-6, TC250, TC275-1, TC350-1, TC420), certain prepregs manufactured by Cytec Solvay Group (e.g., part nos. CYCOM 6101, CYCOM 5320-1, CYCOM 5215, MTM45-1, MTM44-1), certain prepregs manufactured by Toray (e.g., part nos. #2510, #2511), and certain prepregs manufactured by Gurit (e.g., part nos. SE70, SE84LV, SE 84 Nano, Sparpreg, WE 91-1, WE 91-2). The lists above should not be taken to be exhaustive; it should be understood that there are numerous autoclave prepregs that are not listed above, and numerous prepregs that are not autoclave prepregs that are not listed above. In some embodiments, one or more substrate(s) (e.g., a first substrate and/or a second substrate, either or both of which may be a prepreg) does not include a channel in the surface that is adjacent to the collection of nanostructures (e.g., surfaces 115 and 125 in FIG. 1A). For example, out of autoclave prepregs generally include channels in their surfaces that allow for the transport of gas (e.g., air) away from the surface that is being bonded. In some embodiments, the first substrate and/or the second substrate can be free of such channels. In some such embodiments, the first and second substrate are free of such channels at their interface surfaces while still forming a strong, low-void bond between each other.

The polymer within the substrate (e.g., the first substrate and/or the second substrate) may be of a variety of suitable types. The polymer can be, for example, an organic polymer. In some embodiments, the polymer is a thermoset polymer (e.g., a thermoset resin). In certain embodiments, the polymer is a thermoplastic polymer (e.g., a thermoplastic resin). Examples of suitable polymers include, but are not limited to, epoxies (e.g., rubber strengthened epoxy), bis-malemides (BMI), polyesters, vinylesters. polyamides, polyimides, polyarylene sulfide, polyetherimide, polyesterimides, polyarylenes, polysulfones, polyethersulfones, polyphenylene sulfide, polyetherimide, polypropylene, polyolefins, polyketones, polyetherketones, polyetherketoneketone, polyetheretherketones, and/or polyester. In some embodiments, the polymer may be a resin (e.g., a thermoplastic resin, a thermoset resin) in a prepreg as described above. In some (although not necessarily all) embodiments, it can be advantageous to use at least one polyetheretherketone and/or at least one polyetherketoneketone as the polymer material.

In some embodiments, at least a portion of the polymer in the first substrate and/or the second substrate is a precursor of another material. In some such embodiments, the first substrate and/or the second substrate can be processed to form another material. In some embodiments, the first substrate and/or the second substrate can be carbonized (e.g., via pyrolysis) to form a carbon matrix composite material. As one example, in some embodiments, the first substrate and/or the second substrate comprises a phenolic material that is transformed into a carbon matrix (e.g., via pyrolysis), thus forming a carbon matrix nanocomposite.

In some embodiments, at least a portion of the first substrate and/or the second substrate is formed of a sol-gel.

In certain embodiments, the methods described herein may be part of an infusion processing process, a bonding process, a joining process, and/or a press forming process.

Certain methods described herein may comprise one or more steps in which one or more substrate(s) are heated. The substrate(s) may be heated to any suitable temperature. In some embodiments, the substrate(s) may be heated to a temperature of less than or equal to 1200° C., less than or equal to 1000° C., less than or equal to 750° C., less than or equal to 500° C., less than or equal to 400° C., less than or equal to 300° C., or less than or equal to 200° C., less than or equal to 100° C. In some embodiments, the substrate(s) may be heated to a temperature of greater than or equal to 25° C., greater than or equal to 100° C., greater than or equal to 200° C., greater than or equal to 300° C., greater than or equal to 400° C., greater than or equal to 500° C., or greater than or equal to 750° C. Combinations of the above-referenced ranges are also possible (e.g., greater than or equal to 25° C. and less than or equal to 1000° C., or greater than or equal to 25° C. and less than or equal to 1200° C.). Other ranges are also possible.

In some embodiments, one or more substrate(s) may comprise a polymer that softens and/or melts during at least a portion of a heating step. In some embodiments, the polymer may soften and/or melt (e.g., experience a reduction in absolute viscosity to less than or equal to 100 Poise) at a temperature of less than or equal to 350° C., less than or equal to 300° C., less than or equal to 250° C., less than or equal to 200° C., less than or equal to 150° C., less than or equal to 110° C., less than or equal to 100° C., less than or equal to 90° C., less than or equal to 80° C., or less than or equal to 70° C. The polymer may soften and/or melt at a temperature of greater than or equal to 60° C., greater than or equal to 70° C., greater than or equal to 80° C., greater than or equal to 90° C., greater than or equal to 100° C., greater than or equal to 110° C., greater than or equal to 150° C., greater than or equal to 200° C., greater than or equal to 250° C., or greater than or equal to 300° C. Combinations of the above-referenced ranges are also possible (e.g., greater than or equal to 60° C. and less than or equal to 350° C., or greater than or equal to 60° C. and less than or equal to 110° C.). Other ranges are also possible.

In some embodiments, one or more substrate(s) may be heated while in an environment with one or more advantageous features. For example, in some embodiments the substrate(s) may be heated and at least a portion of the heating may not take place in an autoclave. In some embodiments, none of the heating may take place in an autoclave.

In some embodiments, one or more substrate(s) may be heated while in an environment with a pressure that does not exceed 3 bar absolute. That is, a heating process may be performed such that the pressure of the environment is less than 3 bar absolute during the entirety of the heating process. In some embodiments, the pressure in the environment may not exceed 2.5 bar absolute during any part of a heating step, may not exceed 2 bar absolute during any part of a heating step, may not exceed 1.5 bar absolute during any part of a heating step, may not exceed 1 bar absolute during any part of a heating step, or may not exceed 0.5 bar absolute during any part of a heating step. As used herein, the absolute pressure refers to the total amount of pressure within the environment (i.e., an environment at atmospheric pressure would have an absolute pressure of 1.01325 bar). One of ordinary skill in the art would understand that the absolute pressure of an environment may be determined by adding the atmospheric pressure surrounding the environment to the gauge pressure of the environment. The pressure may be isotropic (i.e., it may have an equal value in all directions) or it may be directional (i.e., the pressure may be higher in some directions than in others). Directional pressure may be applied by, for instance, a hot press.

In some embodiments, at least a portion of a collection of nanostructures may become at least partially embedded in one or more substrates when in an environment with a pressure of less than 3 bar absolute (e.g., during heating). In some embodiments, a collection of nanostructures the collection of nanostructures may become at least partially embedded in one or more substrates when in an environment with a pressure of less than 3 bar absolute. At least a portion of the collection of nanostructures and/or the collection of nanostructures may become at least partially embedded in one or more substrates when the environment has a pressure of less than or equal to 3 bar absolute, less than or equal to 2.5 bar absolute, less than or equal to 2 bar absolute, less than or equal to 2 bar absolute, less than or equal to 1.5 bar absolute, less than or equal to 1 bar absolute, or less than or equal to 0.5 bar absolute.

In some embodiments, a portion of a collection of nanostructures may become at least partially embedded in one or more substrates when under the influence of capillary forces (e.g., during heating). The capillary forces may be exerted on the substrate and/or a component thereof (e.g., on a polymer therein), and may draw the substrate and/or component thereof at least partially into the portion of the collection of nanostructures. In some embodiments, the capillary forces may be exerted by the portion of the collection of nanostructures that becomes at least partially embedded in the substrate(s). The capillary forces may be sufficiently large during the period of time over which the portion of the collection of nanostructures becomes at least partially embedded in the substrate(s) to cause the portion of the collection of nanostructures to become at least partially embedded in the substrate(s) when the substrate(s) are arranged in an environment at a pressure that would otherwise be too low to cause the portion of the collection of nanostructures to become at least partially embedded in the substrate(s). In some cases, the capillary forces may be sufficiently large during the period of time over which the portion of the collection of nanostructures becomes at least partially embedded in the substrate(s) to cause the portion of the collection of nanostructures to become at least partially embedded in the substrate(s) when the substrate(s) are arranged in an environment to form a composite of a quality that would not be obtainable absent the capillary forces.

In some embodiments, a portion of a collection of nanostructures may become at least partially embedded in a substrate when capillary forces applied to the substrate are greater than or equal to 1% larger than the force applied to the substrate by an environment in which it is arranged, greater than or equal to 2% larger than the force applied to the substrate by the environment in which it is arranged, greater than or equal to 5% larger than the force applied to the substrate by the environment in which it is arranged, greater than or equal to 10% larger than the force applied to the substrate by the environment in which it is arranged, greater than or equal to 20% larger than the force applied to the substrate by the environment in which it is arranged, greater than or equal to 50% larger than the force applied to the substrate by the environment in which it is arranged, greater than or equal to 100% larger than the force applied to the substrate by the environment in which it is arranged, greater than or equal to 200% larger than the force applied to the substrate by the environment in which it is arranged, or greater than or equal to 500% larger than the force applied to the substrate by the environment in which it is arranged. The portion of the collection of nanostructures may become at least partially embedded in the substrate when the capillary forces applied to the substrate are when capillary forces applied to the substrate are less than or equal to 1000% larger than the force applied to the substrate by the environment in which it is arranged, less than or equal to 500% larger than the force applied to the substrate by the environment in which it is arranged, less than or equal to 200% larger than the force applied to the substrate by the environment in which it is arranged, less than or equal to 100% larger than the force applied to the substrate by the environment in which it is arranged, less than or equal to 50% larger than the force applied to the substrate by the environment in which it is arranged, less than or equal to 20% larger than the force applied to the substrate by the environment in which it is arranged, less than or equal to 10% larger than the force applied to the substrate by the environment in which it is arranged, less than or equal to 5% larger than the force applied to the substrate by the environment in which it is arranged, or less than or equal to 2% larger than the force applied to the substrate by the environment in which it is arranged. Combinations of the above-referenced ranges are also possible (e.g., greater than or equal to 1% and less than or equal to 1000%). Other ranges are also possible. Capillary forces may be measured using a Darcy-Law experiment.

As described above, certain embodiments relate to methods for forming composite articles. The composite articles formed by these methods may have one or more advantageous properties. For example, the composite articles may have a relatively small number voids. In some embodiments, the percentage of the composite article occupied by voids may be less than or equal to 10%, less than or equal to 5%, less than or equal to 2%, less than or equal to 1%, less than or equal to 0.5%, or less than or equal to 0.2%. The percentage of the composite article occupied by voids may be greater than or equal to 0.1%, greater than or equal to 0.2%, greater than or equal to 0.5%, greater than or equal to 1%, greater than or equal to 2%, or greater than or equal to 5%. Combinations of the above-referenced ranges are also possible (e.g., greater than or equal to 0.1% and less than or equal to 5%, greater than or equal to 0.1% and less than or equal to 2%, or greater than or equal to 0.1% and less than or equal to 10%). Other ranges are also possible. The percentage of the composite article occupied by voids may be determined by analyzing computerized X-ray tomography images. Briefly, three dimensional computerized X-ray tomography images are taken of the composite and voids in the images are identified by image processing software.

In some embodiments, the percentage of a composite article occupied by voids in the interlaminar regions therein may be relatively small. The percentage of the interlaminar regions occupied by voids may be less than or equal to less than or equal to 10%, less than or equal to 5%, less than or equal to 2%, less than or equal to 1%, less than or equal to 0.5%, or less than or equal to 0.2%. The percentage of the interlaminar regions occupied by voids may be greater than or equal to 0.1%, greater than or equal to 0.2%, greater than or equal to 0.5%, greater than or equal to 1%, greater than or equal to 2%, or greater than or equal to 5%. Combinations of the above-referenced ranges are also possible (e.g., greater than or equal to 0.1% and less than or equal to 5%, greater than or equal to 0.1% and less than or equal to 2%, or greater than or equal to 0.1% and less than or equal to 10%). Other ranges are also possible. The percentage of the composite article occupied by voids may be determined by analyzing computerized X-ray tomography images as described above.

In some embodiments, a composite article formed by a method described herein may comprise two or more substrates that are in contact along an interface comprising relatively few voids. In some embodiments, two or more substrates may be in contact along an interface in which less than or equal to 10% of the interfacial surface area is occupied by voids, less than or equal to 5% of the interfacial surface area is occupied by voids, less than or equal to 2% of the interfacial surface area is occupied by voids, less than or equal to 1% of the interfacial surface area is occupied by voids, less than or equal to 0.5% of the interfacial surface area is occupied by voids, or less than or equal to 0.2% of the interfacial surface area is occupied by voids. Two or more substrates may be in contact along an interface in which greater than or equal to 0.1% of the interfacial surface area is occupied by voids, greater than or equal to 0.2% of the interfacial surface area is occupied by voids, greater than or equal to 0.5% of the interfacial surface area is occupied by voids, greater than or equal to 1% of the interfacial surface area is occupied by voids, greater than or equal to 2% of the interfacial surface area is occupied by voids, or greater than or equal to 5% of the interfacial surface area is occupied by voids. Combinations of the above-referenced ranges are also possible (e.g., greater than or equal to 0.1% and less than or equal to 10%, greater than or equal to 0.1% and less than or equal to 2%, or greater than or equal to 0.1% and less than or equal to 1%). Other ranges are also possible. As used herein, the percentage of the interfacial surface area occupied by voids is the percentage occupied by voids of the area of a plane that passes through the center of an interface between two substrates and is parallel to the interface between the two substrates. The percentage of interfacial surface area that is occupied by voids may be determined by analyzing computerized X-ray tomography images as described above.

In some embodiments, a method as described herein may result in the formation of an article with a relatively high interlaminar shear strength as measured in a short beam shear strength test (referred to herein as a short beam shear strength for brevity). In some embodiments, the short beam shear strength may be at least 1 MPa, at least 5 MPa, at least 10 MPa, or at least 50 MPa (and/or, in some embodiments, as large as 100 MPa, 200 MPa, 300 MPa, 400 MPa, 500 MPa, or more). The short beam shear strength of the resultant composite may be measured in accordance with ASTM D2344/2344M-16. Briefly, a composite is inserted into a test fixture, and aligned and centered so that its longitudinal axis is perpendicular to the loading nose and side supports of the text fixture. Then, the span of the text fixture and loading nose are adjusted so that a ratio of the span to the measured thickness of the composite is 4.0+/−0.3 mm, the loading nose is equidistant between the side supports to within +/−0.3 mm, and the loading nose and side supports overhang the composite width by at least 2 mm on each side. Next, a load is applied to the composite until one of the following conditions is met: a load drop-off of 30% is observed, a two-piece composite failure is observed, or the head travel exceeds the composite nominal thickness. At the conclusion of the test, the short beam shear strength may be calculated by the following equation:

$$F^{sbs} = 0.75 \cdot \frac{P_m}{b \cdot h},$$

where $F^{sbs}$ is the short beam shear strength, $P_m$ is the maximum load observed during the test, b is the measured composite width, and h is the measured composite thickness.

In some embodiments, a method as described herein may result in the formation of a composite article including fewer voids than would be found in a composite article fabricated by a different method (e.g., a method in which a collection of nanostructures is not arranged between two substrates, a method in which nanostructures within a collection of nanostructures do not become at least partially embedded in one or more substrates). In some embodiments, a method described herein may result in at least 10% (or at least 20%, at least 50%, at least 75%, at least 95%, at least 99%, or 100%) less void volume (measured relative to the larger amount of void volume) than would be present if no collection of nanostructures were arranged between the two substrates but the processing conditions were otherwise identical. In some embodiments, a method described herein may result in at least 10% (or at least 20%, at least 50%, at least 75%, at least 95%, at least 99%, or 100%) less void volume (measured relative to the larger amount of void volume) than would be present if the collection of nanostructures did not become at least partially embedded in one or more substrates but the processing conditions were otherwise identical.

In some embodiments, a method in which the collection of nanostructures contains a relatively low amount of polymer (e.g., in which polymer makes up less than or equal to 10 vol % (or less than 5 vol %, less than 2 vol %, or less than 1 vol %) of the collection of nanostructures) may result in the formation of a composite article including fewer voids than would be found in a composite article in which polymer makes up a higher amount of the collection of nanostructures, processed under otherwise identical conditions. In some embodiments, a method in which polymers make up less than or equal to 10 vol % (or less than 5 vol %, less than 2 vol %, or less than 1 vol %) of the collection of nanostructures) of the collection of nanostructures may result in at least 10% (or at least 20%, at least 50%, at least 75%, at least 95%, at least 99%, or 100%) less void volume in the final composite than would be formed if the collection of nanostructures were made up of 20 vol % (or more) polymer and processed under otherwise identical conditions.

In some embodiments, the volume fraction of the voids in the final composite can be within 50% of, within 20% of, within 10% of, within 5% of, within 2% of, or within 1% of the volume fraction of the voids in a composite that is manufactured using a pressure of 6 bar absolute but under otherwise essentially identical conditions.

In some embodiments, a collection of nanostructures may become relatively deeply embedded within one or more substrates. The collection of nanostructures may be embedded within one or more substrates at a depth of greater than or equal to 10 microns, greater than or equal to 50 microns, greater than or equal to 100 microns, greater than or equal to 1 mm, or deeper. The depth at which the collection of nanostructures are embedded may be determined by finding the number average areal average depth of penetration of the nanostructures, where the areal depth of penetration of the nanostructures is defined as the depth below an upper surface of the substrate at which the deepest nanostructure within the area is present. The number average areal depth of penetration may be determined by performing X-ray tomography and analyzing the images obtained.

The following examples are intended to illustrate certain embodiments of the present invention, but do not exemplify the full scope of the invention.

Example 1

This Example shows the effects on ultimate composite structure and performance of positioning a collection of nanostructures between two substrates prior to heating the substrates to form the composite and the effect of spatially varying the heat applied to the substrates during the heating process employed to form the composite.

Sixteen plies of an AS4/8552 [0/90/+45/−45]2s prepreg (manufactured by Hexcel) were assembled and then heated using one of six different strategies. The strategies, summarized below in Table 1, used one of three different heating methods and either employed a carbon nanotube forest to "nanostitch" each ply together or did not. As used herein, the term "nanostitch" is used to describe the arrangement of an carbon nanotube forest between two substrates. Examples of such an arrangement are shown in FIGS. 1C and 2C.

TABLE 1

Summary of processing strategies.

| Strategy No. | Method of heating | Include nanostitch? |
|---|---|---|
| Strategy 1 | Autoclave | No |
| Strategy 2 | Autoclave | Yes |
| Strategy 3 | Hot plate with spatially uniform heating | No |
| Strategy 4 | Hot plate with spatially uniform heating | Yes |
| Strategy 5 | Resistive heating by carbon nanotube heaters with spatially varying heating | No |
| Strategy 6 | Resistive heating by carbon nanotube heaters with spatially varying heating | Yes |

For each strategy, the prepregs were heated to 110° C., held at 110° C. for 60 minutes, heated to 180° C., and then held at 120° C. for 60 minutes. The prepregs were heated from room temperature to 110° C. at a rate of 3° C. per minute and from 110° C. to 180° C. at a rate of 3° C. per minute. When heated in an autoclave, the prepregs were heated by the autoclave; when heated by a hot plate with spatially uniform heating, the entirety of the prepregs were placed on a hot plate which heated each part of the prepreg at substantially the same rate; and when heated by resistive heating with spatially varying heating, carbon nanotube resistive heaters were placed on certain locations on the upper and lower surfaces of the prepregs. The carbon nanotube heaters were formed by knocking down a forest of carbon nanotubes with an average length of approximately 500 microns.

For strategies that included nanostitch (Strategies 2, 4, and 6), a collection of nanostructures was positioned between each ply prior to heating. The collection of nanostructures was a forest of carbon nanotubes with an average length of approximately 20 microns.

Figure 7:
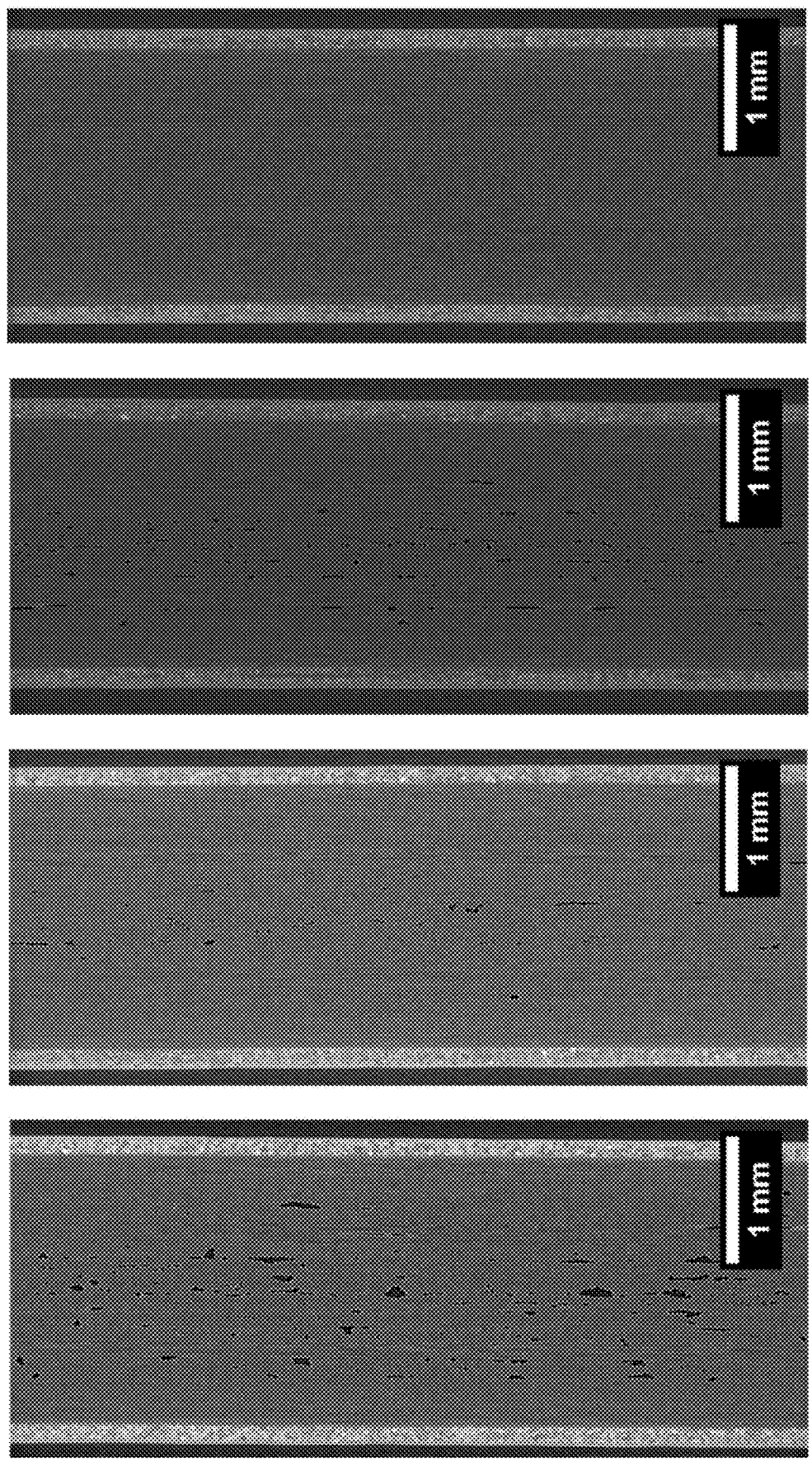
FIGS. 7-8 are micrographs of composites formed in accordance with certain embodiments.
Figure 8:
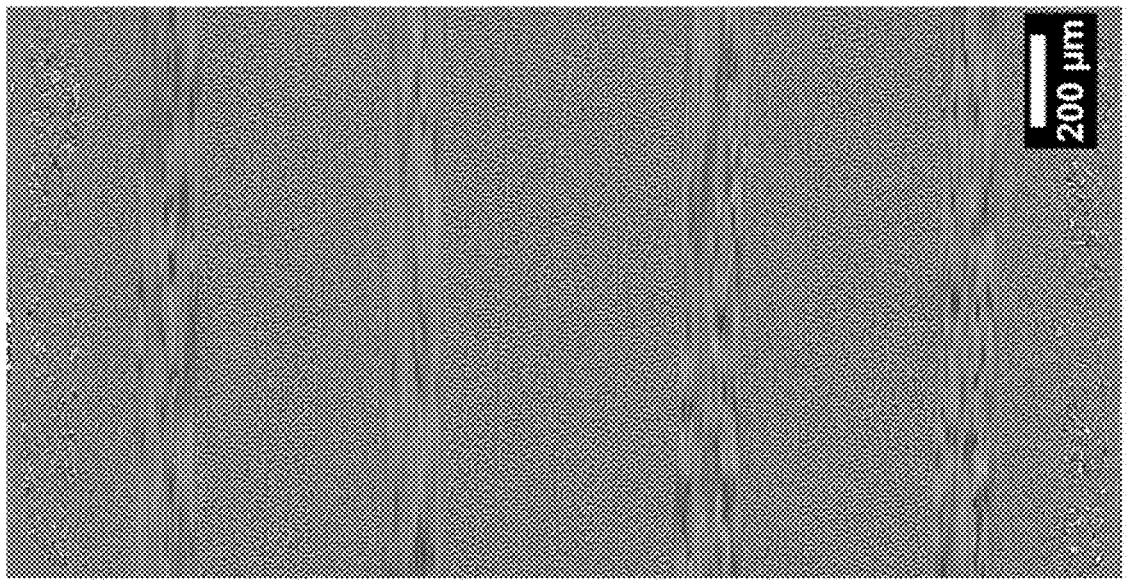
Figure 8:
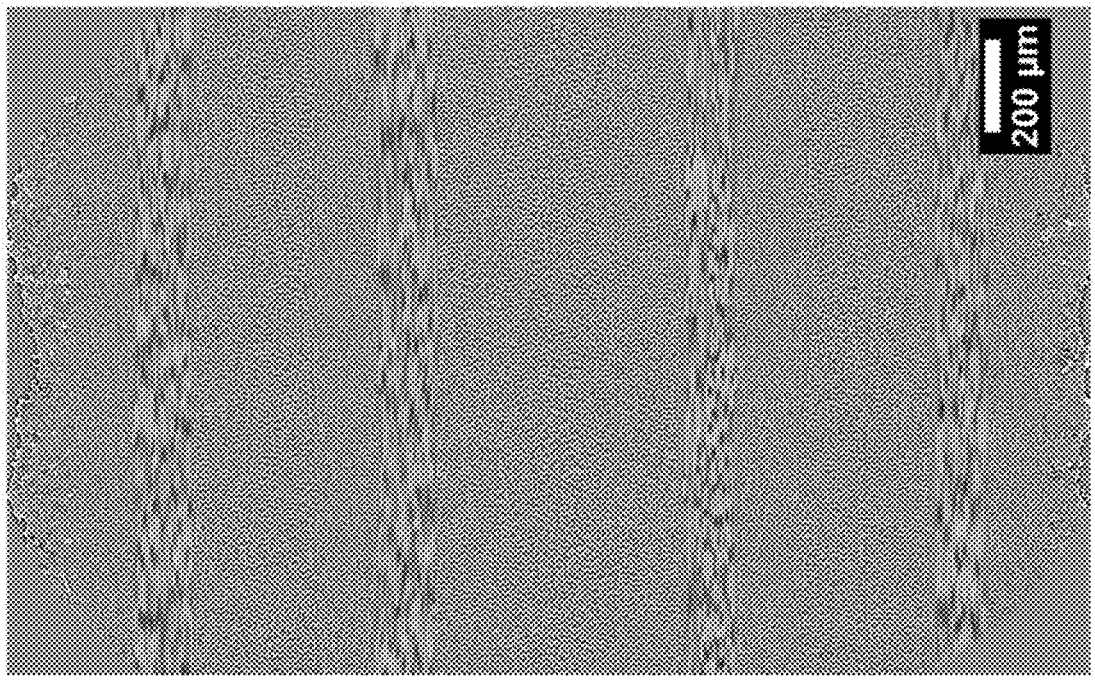
Figure 9:
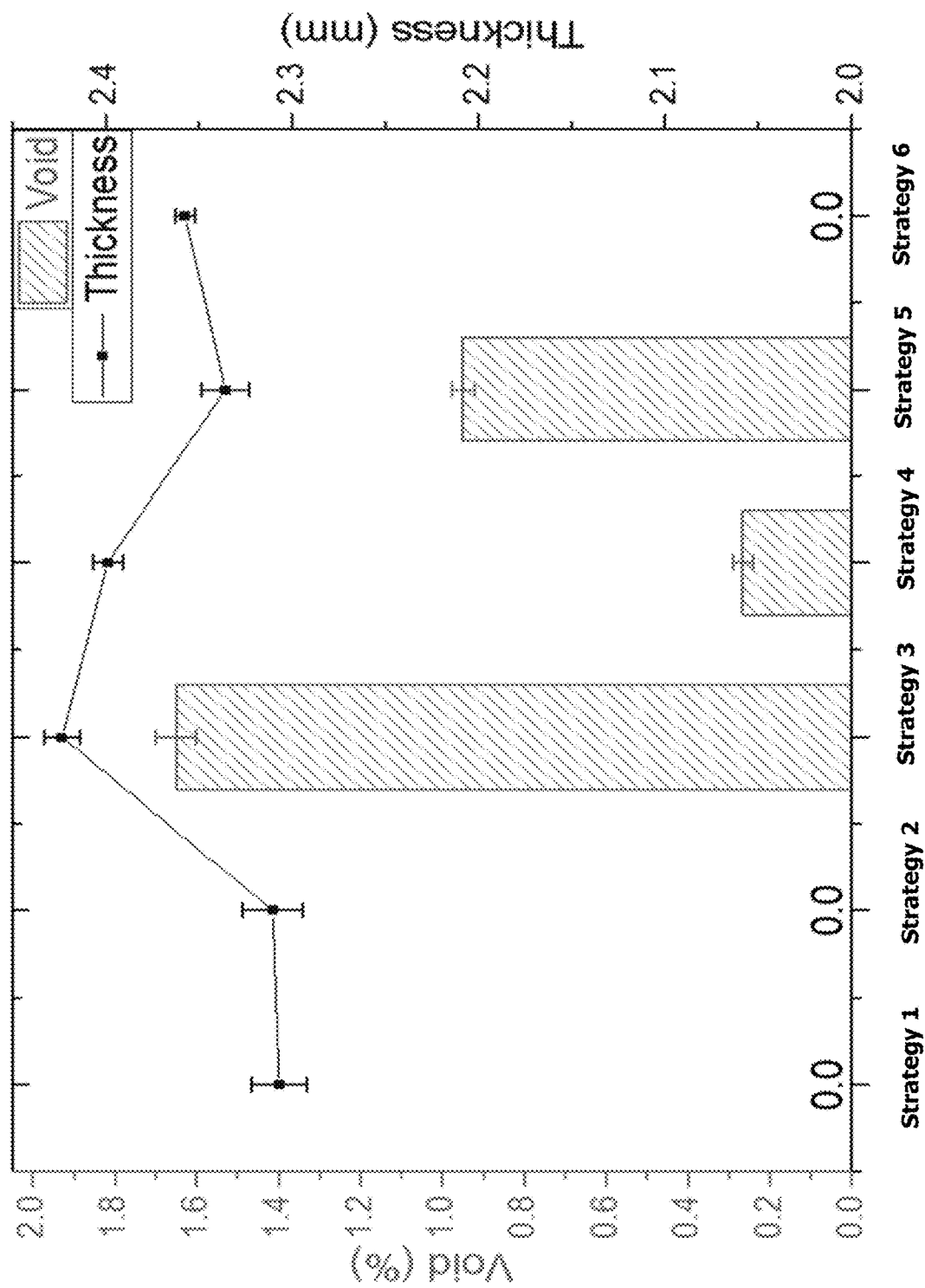
FIGS. 9-10 are charts showing properties of composites formed in accordance with certain embodiments.
Figure 10:
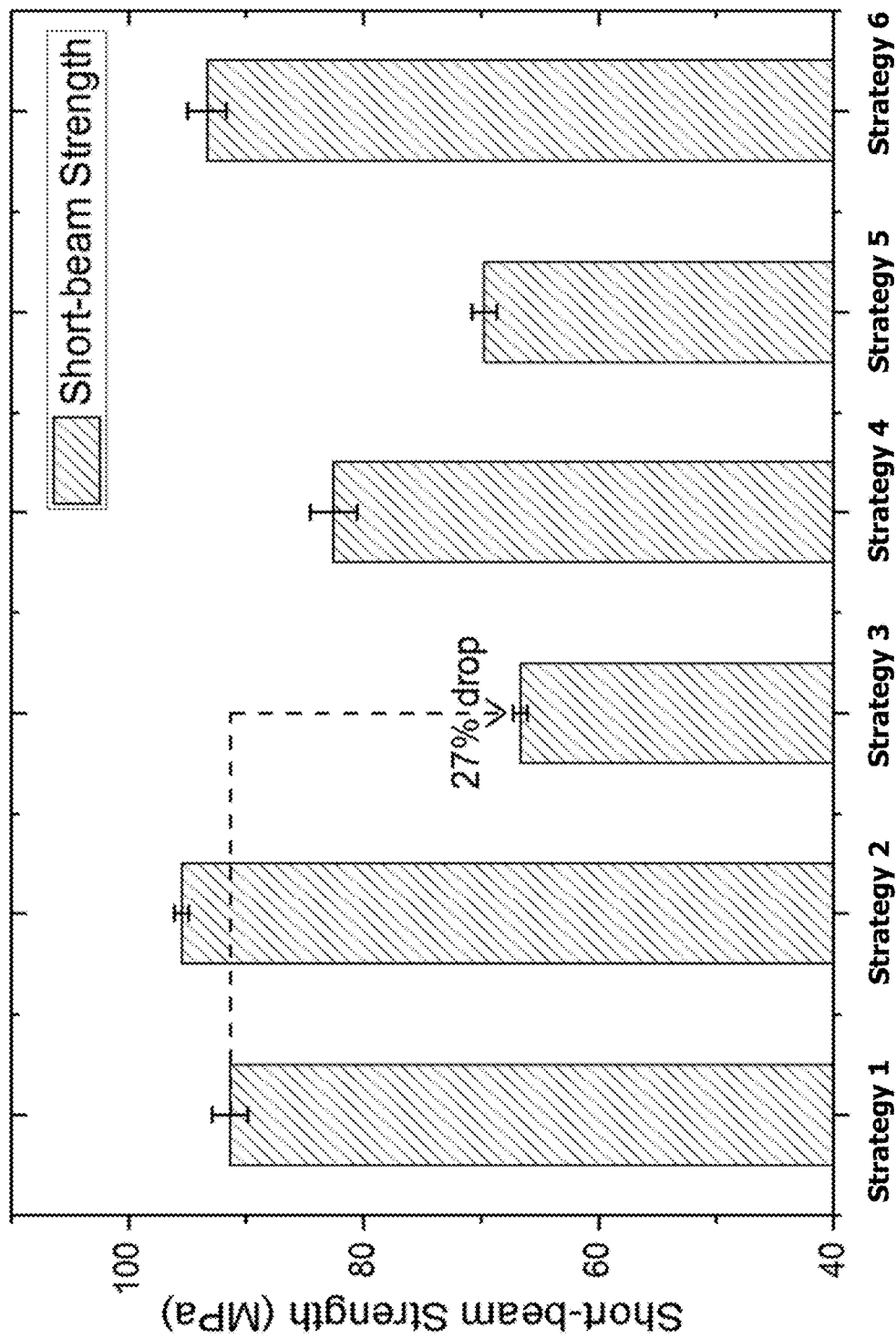

Both employing nanostitch and applying spatially varying heating reduced the number of voids formed in the resultant composite articles. FIG. 7 shows representative micrographs of composite articles formed by Strategies 3-6. From this Figure, it is apparent that Strategy 6 outperforms all of the other strategies shown, Strategy 5 outperforms Strategy 3, and Strategy 4 outperforms Strategy 3. FIG. 8 includes representative micrographs of composite articles formed by Strategies 2 and 6, showing that the combination of spatially varying heating and nanostitch performs similarly to the combination of autoclave heating and nanostitch. FIG. 9 shows void content and thickness for the composites formed by each strategy, and FIG. 10 shows the short-beam shear strength as measured by a short beam shear test (performed on ten samples formed by each strategy) for the composites formed by each strategy. Both FIGS. 9 and 10 further indicate that both the presence of spatially varying heating and the presence of nanostitch improve performance. Strategy 6, which includes both spatially varying heating and nanostitch, performs similarly to Strategies 1 and 2, in which an autoclave was employed, in both void content and inter laminar shear strength.

Example 2

This Example shows the effects of spatially and temporally varying the heat applied to substrates during composite formation.

Figure 11:
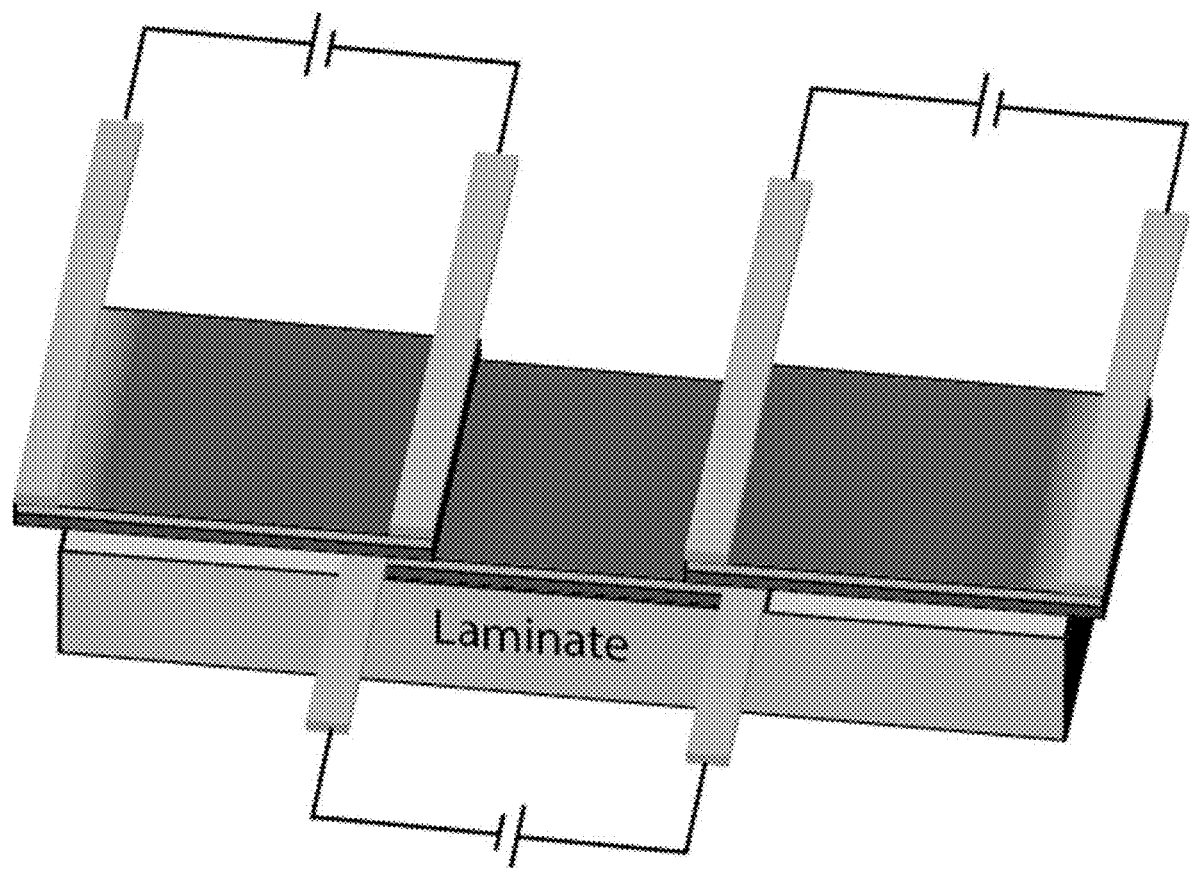
FIG. 11 depicts a method of providing spatially varying heat to a substrate in accordance with certain embodiments.
Figure 12:
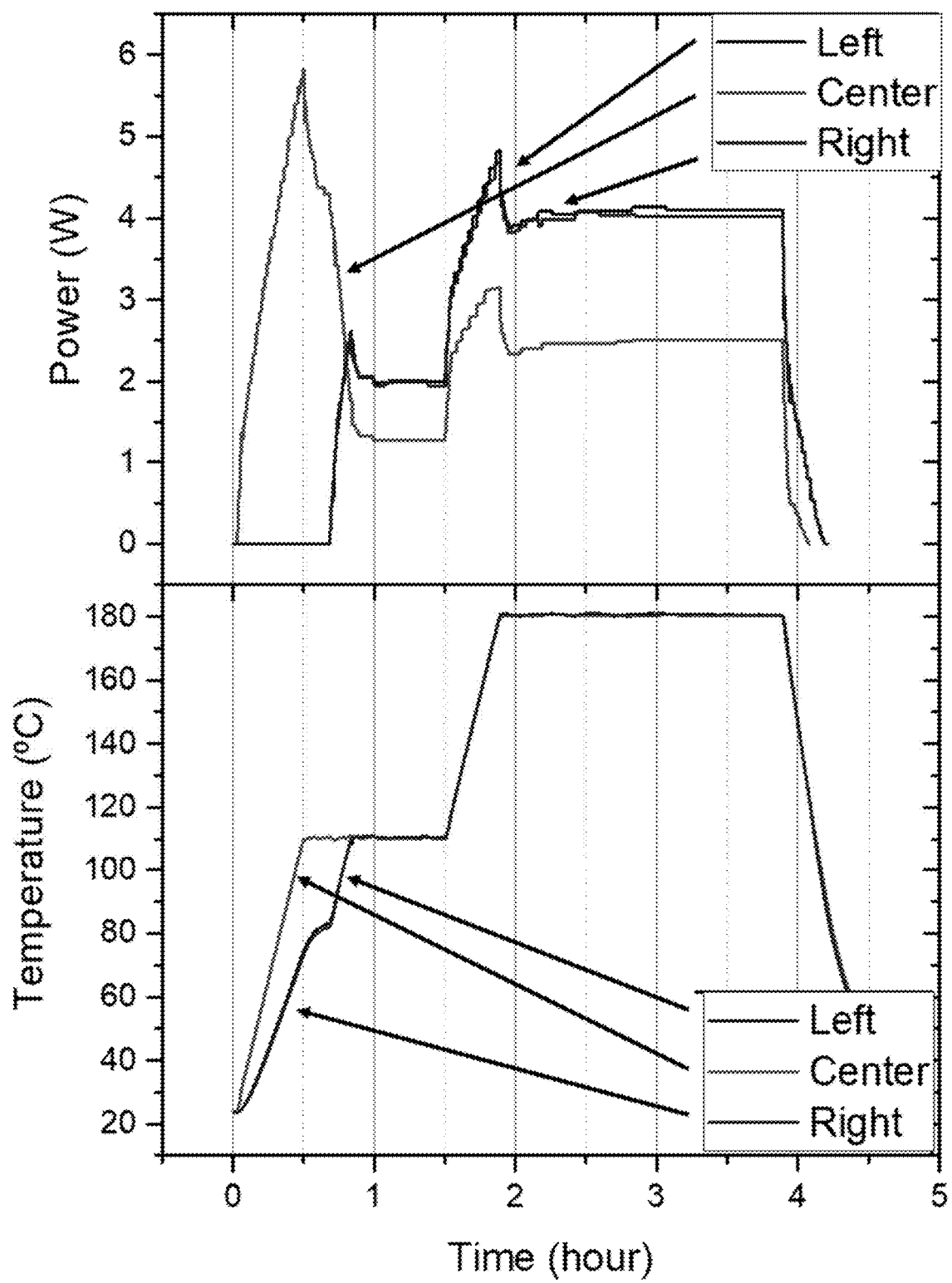
FIG. 12 is a chart showing temperature and power as a function of time in accordance with certain embodiments.

Plies were assembled together in the same manner as described in Example 1. Heating was provided as in Strategy 6, except that the carbon nanotube heaters were spatially translated from the center of the plies outwards during the heating process (in a sweeping process). FIG. 11 shows a schematic depiction of the setup used to provide spatially varying heating; FIG. 12 shows the power provided to different regions of the prepreg as a function of time and the temperature in different regions of the prepreg as a function of time during spatially varying heating.

Figure 13:
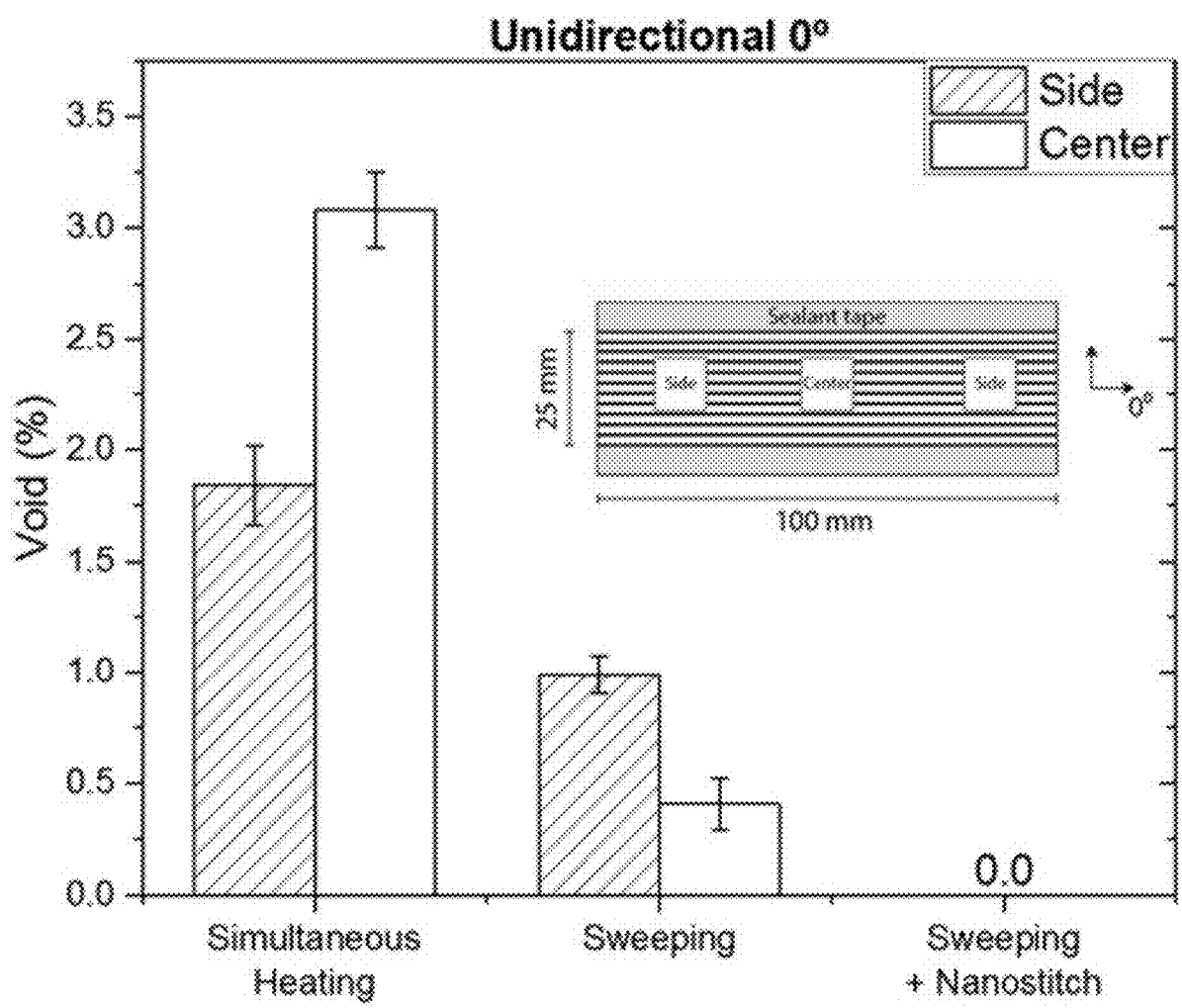
FIGS. 13-14 are charts showing properties of composites formed in accordance with certain embodiments.
Figure 14:
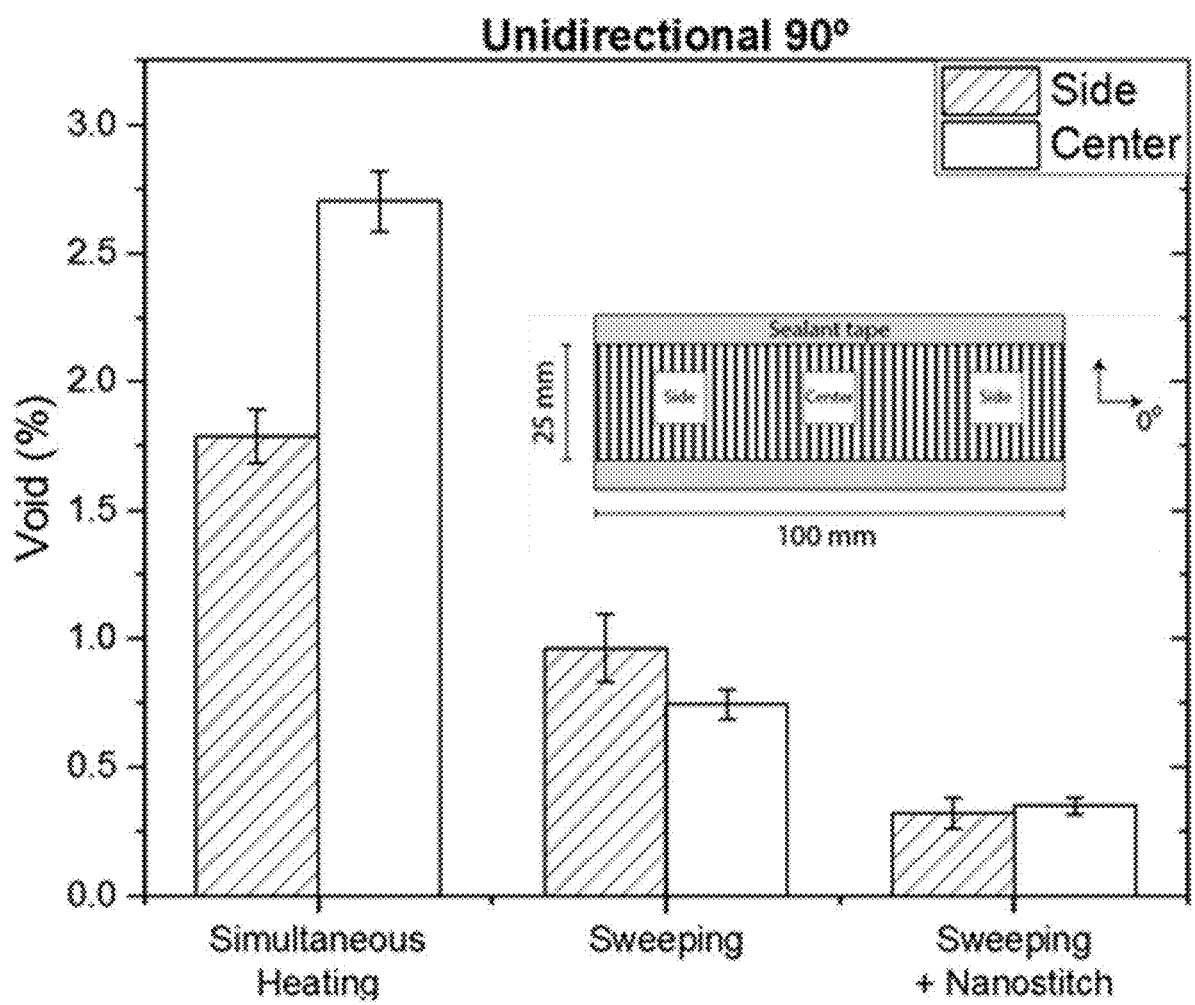

Spatially and temporally varying the amount of heat applied to the prepregs improved the properties of the resultant composites. Composites formed by applying heat in a sweeping process had fewer voids than those formed by applying heat in a constant manner. FIGS. 13 and 14 show the amount of voids in composites formed by applying heat in a constant manner (as in Strategy 6), applying heat in a sweeping manner to composites lacking nanostitch, and applying heat in a sweeping manner to composites including nanostitch. FIG. 13 shows the void content when the source of heating was translated parallel to the fibers in the prepregs, and FIG. 14 shows the void content when the source of heating was translated perpendicular to the fibers in the prepreg.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

As used herein in the specification and in the claims, the phrase "at least a portion" means some or all. "At least a portion" may mean, in accordance with certain embodiments, at least 10%, at least 25%, at least 50%, at least 75%, at least 90%, at least 95%, or at least 99%, and/or, in certain embodiments, up to 100%.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of forming a composite article, comprising:
arranging, within an environment, a forest comprising elongated nanostructures between a surface of a first substrate comprising a polymer and a surface of a second substrate comprising a polymer, wherein the elongated nanostructures within the forest have long axes that are substantially aligned with each other and that are substantially perpendicular to the surface of the first substrate and substantially perpendicular to the surface of the second substrate; and heating the first substrate and the second substrate such that polymer within the first substrate and polymer within the second substrate softens and/or melts, and nanostructures within the forest become at least partially embedded in the first substrate and the second substrate via capillary action, to form the composite article within which the long axes of the nanostructures are substantially aligned with each other;

wherein:
- the forest of elongated nanostructures has a height;
- the forest of elongated nanostructures has a first dimension that is substantially perpendicular to the height of the forest, the first dimension being at least 100 times greater than the height of the forest;
- the forest of elongated nanostructures has a second dimension that is substantially perpendicular to the height of the forest and substantially perpendicular to the first dimension, the second dimension being at least 100 times greater than the height of the forest;
- during at least a portion of the arranging step, the forest of nanostructures is separate from the first substrate and the second substrate;
- a pressure of the environment does not exceed, during any part of the heating step, 3 bar absolute; and
- after the heating, the percentage of an interlaminar region of the composite occupied by voids is less than or equal to 1%.

2. The method of claim 1, wherein heating the first substrate and the second substrate comprises moving a source of the heat laterally across the first substrate and the second substrate.

3. The method of claim 1, wherein the forest of nanostructures comprises carbon-based nanostructures.

4. The method of claim 1, wherein the forest of nanostructures comprises carbon nanotubes.

5. The method of claim 1, wherein the first substrate comprises a prepreg.

6. The method of claim 5, wherein the second substrate comprises a prepreg.

7. The method of claim 5, wherein the prepreg is an autoclave prepreg.

8. The method of claim 7, wherein the heating does not take place within an autoclave.

9. The method of claim 1, wherein the forest of nanostructures has a number average nearest neighbor distance of less than or equal to 100 nm.

10. The method of claim 9, wherein the forest of nanostructures has a number average nearest neighbor distance of greater than or equal to 1 nm.

11. The method of claim 1, wherein the forest of nanostructures has a volume fraction of nanostructures of greater than or equal to 0.001.

12. The method of claim 11, wherein the forest of nanostructures has a volume fraction of nanostructures of less than or equal to 0.8.

13. The method of claim 1, wherein at least a portion of the nanostructures comprise carbon, silicon, indium-gallium-arsenide materials, boron nitride, silicon nitride, silicon carbide, dichalcogenides, oxides, boron-carbon-nitrogen compounds, and/or polymers.

14. The method of claim 1, wherein the composite article has at least 10% less void volume than would be present if no forest of nanostructures were arranged between the first substrate and the second substrate but the processing conditions were otherwise identical.

15. A method of forming a composite article, comprising:
heating within a first environment a first substrate comprising a polymer in the presence of a forest comprising elongated nanostructures such that polymer within the first substrate softens and/or melts, and nanostructures within the forest become at least partially embedded in the first substrate via capillary action; and heating within a second environment that is the same as or different than the first environment a second substrate comprising a polymer in the presence of the elongated nanostructures such that polymer within the second substrate softens and/or melts, and the nanostructures become at least partially embedded in the second substrate via capillary action, such that the composite article is formed within which long axes of the nanostructures are substantially aligned with each other;

wherein:
- the forest of elongated nanostructures has a height;
- the forest of elongated nanostructures has a first dimension that is substantially perpendicular to the height of the forest, the first dimension being at least 100 times greater than the height of the forest;
- the forest of elongated nanostructures has a second dimension that is substantially perpendicular to the height of the forest and substantially perpendicular to the first dimension, the second dimension being at least 100 times greater than the height of the forest;
- a pressure of the first environment does not exceed the fir during any part of the heating within the first environment, 3 bar absolute and a pressure of the second environment does not exceed, during any part of the heating within the second environment, 3 bar absolute; and
- after the heating, the percentage of an interlaminar region of the composite article occupied by voids is less than or equal to 1%.

* * * * *

UNITED STATES PATENT AND TRADEMARK OFFICE
CERTIFICATE OF CORRECTION

PATENT NO. : 11,760,848 B2
APPLICATION NO. : 17/375190
DATED : September 19, 2023
INVENTOR(S) : Jeonyoon Lee et al.

It is certified that error appears in the above-identified patent and that said Letters Patent is hereby corrected as shown below:

In the Claims

Claim 15, Column 30, Lines 42-43:
"a pressure of the first environment does not exceed the
fir during any part of the heating within the first"

Should read:
--a pressure of the first environment does not exceed,
during any part of the heating within the first--

Signed and Sealed this
Twentieth Day of August, 2024

Katherine Kelly Vidal
*Director of the United States Patent and Trademark Office*